US011997340B2

(12) United States Patent
Burkitt et al.

(10) Patent No.: US 11,997,340 B2
(45) Date of Patent: May 28, 2024

(54) TOPICAL CONTENT SEARCHING

(71) Applicant: Comcast Cable Communications, LLC, Philadelphia, PA (US)

(72) Inventors: Kevin J. Burkitt, Palo Alto, CA (US);
Eoin G. Dowling, Palo Alto, CA (US);
Michael M. Bennett, Redwood City, CA (US); Trevor R. Branon, San Francisco, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 320 days.

(21) Appl. No.: 15/695,580

(22) Filed: Sep. 5, 2017

(65) Prior Publication Data
US 2017/0366828 A1 Dec. 21, 2017

Related U.S. Application Data

(63) Continuation of application No. 14/148,552, filed on Jan. 6, 2014, now abandoned, which is a
(Continued)

(51) Int. Cl.
*H04N 21/2743* (2011.01)
*H04N 21/234* (2011.01)
(Continued)

(52) U.S. Cl.
CPC ..... *H04N 21/278* (2013.01); *H04N 21/23424* (2013.01); *H04N 21/234336* (2013.01);
(Continued)

(58) Field of Classification Search
CPC ......... G06F 17/30796; G06F 17/30817; G06F 17/30828; G06F 17/3084;
(Continued)

(56) References Cited

U.S. PATENT DOCUMENTS 5,946,050 A 8/1999 Wolff
6,502,065 B2 * 12/2002 Imanaka ............. G06F 17/2715
348/468
(Continued)

FOREIGN PATENT DOCUMENTS

| GB | 2388738 A | 11/2003 |
| KR | 100828166 B1 | 5/2008 |
| WO | 2008011142 A2 | 1/2008 |

OTHER PUBLICATIONS

International Search Report and Written Opinion, 10 pages—App PCT/US2013/037866, dated Aug. 12, 2013.
(Continued)

*Primary Examiner* — John W Miller
*Assistant Examiner* — Akshay Doshi
(74) *Attorney, Agent, or Firm* — Banner & Witcoff, Ltd.

(57) ABSTRACT

Self-learning systems process incoming data from sources such broadcast, cable, or IP-driven television and can discover topics that broadly describe the incoming data in real-time. These topics can be used to gather and store metadata from various metadata sources such as social networks. Using the metadata, content delivery systems working in parallel with the self-learning systems can deliver highly contextualized supplementary content to client applications, such as mobile devices used as "second screen" devices.

28 Claims, 28 Drawing Sheets

Related U.S. Application Data continuation-in-part of application No. 13/840,103, filed on Mar. 15, 2013.

(60) Provisional application No. 61/749,889, filed on Jan. 7, 2013, provisional application No. 61/639,829, filed on Apr. 27, 2012.

(51) Int. Cl.

| | |
|---|---|
| *H04N 21/2343* | (2011.01) |
| *H04N 21/278* | (2011.01) |
| *H04N 21/41* | (2011.01) |
| *H04N 21/4402* | (2011.01) |
| *H04N 21/845* | (2011.01) |

(52) U.S. Cl.
CPC ... *H04N 21/2743* (2013.01); *H04N 21/41265* (2020.08); *H04N 21/440236* (2013.01); *H04N 21/845* (2013.01); *H04N 21/8456* (2013.01)

(58) Field of Classification Search
CPC ....... H04N 21/25891; H04N 21/26603; H04N 21/482; H04N 21/4828; H04N 21/632; H04N 21/812; H04N 7/17318; H04N 21/23424; H04N 21/234336; H04N 21/2743; H04N 21/278; H04N 21/4126; H04N 21/440236; H04N 21/845; G10L 15/1822; G10L 2015/088

See application file for complete search history.

(56) References Cited

U.S. PATENT DOCUMENTS

| | | | | |
|---|---|---|---|---|
| 6,961,954 | B1* | 11/2005 | Maybury | G11B 27/28 |
| | | | | 725/53 |
| 7,184,959 | B2* | 2/2007 | Gibbon | G06F 16/7834 |
| | | | | 704/270 |
| 7,263,530 | B2* | 8/2007 | Hu | G06F 16/345 |
| 7,620,551 | B2 | 11/2009 | Ho | |
| 7,856,358 | B2 | 12/2010 | Ho | |
| 7,954,056 | B2 | 5/2011 | Graham | |
| 8,042,053 | B2* | 10/2011 | Darwish | G06F 16/94 |
| | | | | 715/762 |
| 8,151,194 | B1 | 4/2012 | Chan et al. | |
| 8,176,046 | B2* | 5/2012 | Druzgalski | G06Q 10/063 |
| | | | | 707/731 |
| 8,176,068 | B2* | 5/2012 | Kunjithapatham | |
| | | | | G06F 16/7867 |
| | | | | 707/766 |
| 8,196,164 | B1 | 6/2012 | Oztaskent et al. | |
| 8,255,948 | B1 | 8/2012 | Black et al. | |
| 8,281,339 | B1 | 10/2012 | Walker et al. | |
| 8,332,895 | B2 | 12/2012 | Nathan et al. | |
| 8,370,348 | B1* | 2/2013 | Reilly | G06Q 30/02 |
| | | | | 707/731 |
| 8,429,170 | B2* | 4/2013 | Ittiachen | G06F 16/335 |
| | | | | 707/747 |
| 8,538,563 | B1 | 9/2013 | Barber | |
| 8,539,359 | B2* | 9/2013 | Rapaport | G06Q 10/10 |
| | | | | 715/751 |
| 8,615,442 | B1 | 12/2013 | Kapur et al. | |
| 8,702,504 | B1 | 4/2014 | Hughes et al. | |
| 8,762,326 | B1 | 6/2014 | Zhou et al. | |
| 8,769,576 | B2* | 7/2014 | Burkitt | H04N 21/431 |
| | | | | 725/40 |
| 8,776,149 | B1 | 7/2014 | Koch et al. | |
| 8,826,131 | B2* | 9/2014 | Suito | G11B 19/025 |
| | | | | 715/716 |
| 8,838,564 | B2* | 9/2014 | Sahni | H04L 67/22 |
| | | | | 707/706 |
| 8,849,829 | B2* | 9/2014 | Shalabi | G06F 17/211 |
| | | | | 707/738 |
| 8,862,573 | B2 | 10/2014 | Musgrove | |
| 8,904,436 | B2* | 12/2014 | Kang | G06Q 10/10 |
| | | | | 725/40 |
| 8,995,767 | B2 | 3/2015 | Graham | |
| 9,100,669 | B2* | 8/2015 | Feng | H04N 21/234336 |
| 9,100,679 | B2 | 8/2015 | Burkitt et al. | |
| 9,110,977 | B1* | 8/2015 | Pierre | G06F 16/3334 |
| 9,253,511 | B2* | 2/2016 | Chen | G06F 16/78 |
| 9,445,036 | B2* | 9/2016 | Hamano | H04H 60/46 |
| 9,491,522 | B1* | 11/2016 | Trollope | H04N 21/8358 |
| 9,544,650 | B1 | 1/2017 | Oztaskent et al. | |
| 9,544,656 | B1 | 1/2017 | Nichols | |
| 9,628,873 | B2* | 4/2017 | Hu | G06F 16/48 |
| 9,659,313 | B2 | 5/2017 | Tsai et al. | |
| 9,668,023 | B1* | 5/2017 | Twyman | H04N 21/4788 |
| 9,799,375 | B2 | 10/2017 | Zhou | |
| 9,826,188 | B2 | 11/2017 | Jackson et al. | |
| 10,149,008 | B1* | 12/2018 | Logan | H04N 21/44218 |
| 10,228,818 | B2* | 3/2019 | Vandermolen | G06F 16/93 |
| 2001/0003214 | A1 | 6/2001 | Shastri et al. | |
| 2002/0073424 | A1 | 6/2002 | Ward et al. | |
| 2004/0025180 | A1* | 2/2004 | Begeja | G06F 17/30017 |
| | | | | 725/46 |
| 2004/0090462 | A1 | 5/2004 | Graham | |
| 2004/0095376 | A1 | 5/2004 | Graham et al. | |
| 2004/0225667 | A1 | 11/2004 | Hu et al. | |
| 2005/0028194 | A1* | 2/2005 | Elenbaas | G11B 27/22 |
| | | | | 725/32 |
| 2005/0166242 | A1 | 7/2005 | Matsumoto et al. | |
| 2005/0198006 | A1 | 9/2005 | Boicey et al. | |
| 2005/0251823 | A1 | 11/2005 | Saarikivi | |
| 2006/0152504 | A1 | 7/2006 | Levy | |
| 2006/0288389 | A1* | 12/2006 | Deutscher | H04N 21/4828 |
| | | | | 725/88 |
| 2007/0043761 | A1* | 2/2007 | Chim | G06F 16/958 |
| 2007/0113255 | A1 | 5/2007 | Kurosawa | |
| 2007/0118364 | A1 | 5/2007 | Wise et al. | |
| 2007/0239686 | A1* | 10/2007 | Quinn-Jacobs | G06F 16/951 |
| 2007/0244902 | A1 | 10/2007 | Seide et al. | |
| 2008/0021755 | A1 | 1/2008 | Jones et al. | |
| 2008/0028292 | A1 | 1/2008 | Graham et al. | |
| 2008/0033826 | A1 | 2/2008 | Maislos et al. | |
| 2008/0066136 | A1 | 3/2008 | Dorai et al. | |
| 2008/0077581 | A1 | 3/2008 | Drayer et al. | |
| 2008/0083003 | A1* | 4/2008 | Biniak | G11B 27/28 |
| | | | | 725/110 |
| 2008/0086688 | A1* | 4/2008 | Chandratillake | G06F 16/738 |
| | | | | 707/E17.028 |
| 2008/0086754 | A1 | 4/2008 | Chen et al. | |
| 2008/0091722 | A1 | 4/2008 | Wendelrup | |
| 2008/0140385 | A1 | 6/2008 | Mahajan et al. | |
| 2008/0147487 | A1 | 6/2008 | Hirshberg | |
| 2008/0225167 | A1 | 9/2008 | Beermann | |
| 2008/0228928 | A1 | 9/2008 | Donelli et al. | |
| 2008/0281783 | A1 | 11/2008 | Papkoff et al. | |
| 2008/0301128 | A1* | 12/2008 | Gandert | G06F 16/3322 |
| | | | | 707/999.005 |
| 2008/0313146 | A1 | 12/2008 | Wong et al. | |
| 2009/0055393 | A1 | 2/2009 | Messer et al. | |
| 2009/0063134 | A1 | 3/2009 | Gallagher et al. | |
| 2009/0064247 | A1 | 3/2009 | Biniak et al. | |
| 2009/0083677 | A1 | 3/2009 | Darwish et al. | |
| 2009/0094286 | A1 | 4/2009 | Lee et al. | |
| 2009/0157720 | A1 | 6/2009 | Kolcz et al. | |
| 2009/0254562 | A1* | 10/2009 | Casaccia | G11B 27/034 |
| 2009/0276419 | A1 | 11/2009 | Jones et al. | |
| 2009/0276500 | A1* | 11/2009 | Karmarkar | H04L 69/08 |
| | | | | 709/206 |
| 2009/0313658 | A1 | 12/2009 | Nishimura et al. | |
| 2010/0071013 | A1* | 3/2010 | Vandermolen | H04N 21/25866 |
| | | | | 725/109 |
| 2010/0083307 | A1 | 4/2010 | Zalewski | |
| 2010/0100537 | A1 | 4/2010 | Druzgalski et al. | |
| 2010/0138859 | A1 | 6/2010 | Ko | |
| 2010/0141655 | A1 | 6/2010 | Belinsky et al. | |
| 2010/0153107 | A1 | 6/2010 | Kawai | |
| 2010/0223056 | A1 | 9/2010 | Kadirkamanathan | |
| 2010/0303436 | A1 | 12/2010 | Chang et al. | |
| 2010/0306232 | A1 | 12/2010 | Heminghous et al. | |

(56) References Cited

U.S. PATENT DOCUMENTS

| | | |
|---|---|---|
| 2010/0306805 A1 | 12/2010 | Neumeier et al. |
| 2010/0333137 A1* | 12/2010 | Hamano ................ H04H 60/46 |
| | | 725/39 |
| 2011/0061075 A1 | 3/2011 | Lee |
| 2011/0099195 A1 | 4/2011 | Patwardhan et al. |
| 2011/0112832 A1 | 5/2011 | Prorock et al. |
| 2011/0125550 A1* | 5/2011 | Erhart ................ G06Q 30/0201 |
| | | 705/7.29 |
| 2011/0125847 A1 | 5/2011 | Cocheu et al. |
| 2011/0154183 A1 | 6/2011 | Burns et al. |
| 2011/0196874 A1 | 8/2011 | Ittiachen |
| 2011/0202515 A1 | 8/2011 | Stiers |
| 2011/0258676 A1 | 10/2011 | Gaskins, III et al. |
| 2011/0282874 A1* | 11/2011 | Xu ..................... G06F 17/30616 |
| | | 707/737 |
| 2011/0307497 A1 | 12/2011 | Connor |
| 2011/0314006 A1* | 12/2011 | Sweeney ........... G06F 16/24578 |
| | | 707/723 |
| 2011/0320715 A1* | 12/2011 | Ickman .................. G06Q 30/02 |
| | | 711/118 |
| 2012/0005224 A1 | 1/2012 | Ahrens et al. |
| 2012/0251079 A1 | 2/2012 | Satoh |
| 2012/0054795 A1* | 3/2012 | Kang ..................... G06Q 10/10 |
| | | 725/40 |
| 2012/0066073 A1 | 3/2012 | Dilip et al. |
| 2012/0066226 A1 | 3/2012 | Moshrefi et al. |
| 2012/0109902 A1 | 5/2012 | Rozensztejn et al. |
| 2012/0109944 A1 | 5/2012 | Hao |
| 2012/0209841 A1 | 8/2012 | Saretto et al. |
| 2012/0226769 A1 | 9/2012 | Basso et al. |
| 2012/0227064 A1 | 9/2012 | Neill |
| 2012/0233256 A1* | 9/2012 | Shaham ................ G06Q 30/02 |
| | | 709/204 |
| 2012/0240144 A1* | 9/2012 | Rose .................. H04N 21/4756 |
| | | 725/14 |
| 2012/0254917 A1 | 10/2012 | Burkitt et al. |
| 2012/0278837 A1 | 11/2012 | Curtis et al. |
| 2012/0291070 A1* | 11/2012 | Feng ................ H04N 21/25866 |
| | | 725/40 |
| 2012/0296920 A1* | 11/2012 | Sahni ...................... H04L 67/22 |
| | | 707/749 |
| 2013/0007043 A1 | 1/2013 | Phillips et al. |
| 2013/0024440 A1 | 1/2013 | Dimassimo et al. |
| 2013/0074109 A1* | 3/2013 | Skelton .............. H04N 21/4821 |
| | | 725/14 |
| 2013/0097259 A1 | 4/2013 | Li et al. |
| 2013/0144869 A1* | 6/2013 | Shalabi ................ G06F 17/211 |
| | | 707/722 |
| 2013/0198204 A1 | 8/2013 | Williams et al. |
| 2013/0204825 A1* | 8/2013 | Su ............................ G06N 5/04 |
| | | 706/46 |
| 2013/0246432 A1* | 9/2013 | Paskin ................ G06F 16/9535 |
| | | 707/740 |
| 2013/0254308 A1 | 9/2013 | Rose et al. |
| 2013/0262575 A1* | 10/2013 | Xiong .................. H04N 21/254 |
| | | 709/204 |
| 2013/0275429 A1* | 10/2013 | York ..................... G06F 16/435 |
| | | 707/737 |
| 2013/0275453 A1* | 10/2013 | Vyas ................. G06F 16/90324 |
| | | 707/767 |
| 2013/0291019 A1 | 10/2013 | Burkitt et al. |
| 2014/0046661 A1 | 2/2014 | Bruner |
| 2014/0067373 A1 | 3/2014 | Wasserblat et al. |
| 2014/0067828 A1 | 3/2014 | Archibong et al. |
| 2014/0123178 A1 | 5/2014 | Burkitt et al. |
| 2014/0136526 A1 | 5/2014 | Calhoun |
| 2014/0366068 A1 | 12/2014 | Burkitt et al. |
| 2015/0012512 A1 | 1/2015 | Lam et al. |
| 2015/0052102 A1 | 2/2015 | Nihal |
| 2015/0071604 A1 | 3/2015 | Yamashita et al. |
| 2015/0341689 A1 | 11/2015 | Burkitt et al. |
| 2016/0014482 A1* | 1/2016 | Chen .................... G11B 27/031 |
| | | 386/241 |

OTHER PUBLICATIONS

International Search Report and Written Opinion, 6 pages—App PCT/US2012/031777, dated Oct. 12, 2012.
Extended European Search Report, EP Appl. No. 12763229.7 (PCT/US2012/031777), dated Feb. 25, 2015, 6 pages.
U.S. Appl. No. 13/840,103, Self-learning methods, entity relations, remote control, and other features for real-time processing, storage, indexing, and delivery of segmented video, filed Mar. 15, 2013.
U.S. Appl. No. 14/148,552, Self-learning methods, entity relations, remote control, and other features for real-time processing, storage, indexing, and delivery of segmented video, filed Jan. 6, 2014.
U.S. Appl. No. 14/816,320, System and method for real-time processing, storage, indexing, and delivery of segmented video, filed Aug. 3, 2015.
Jul. 16, 2019—Great Britain Office Action—GB 1419760.2.
Mar. 25, 2020—Great Britain Office Action—GB 1419760.2.
Mar. 18, 2020—Great Britain Search Report—GB 1419760.2.

* cited by examiner

FIG. 5

Mixaroo

Manage Your Custom Stream — 505

LIVE | Capitol Hill
21:11 Local

BREAKING NEWS
US STATE OF THE UNION
President Obama delivers address for second time Tweet  f Share BBC News 24: State of the Union Speech 506
504

Interactive Transcript

Only in Washington can you be watching the State of the Union with a member of another party. In the light of the Arizona or shootings there is a realization that Americans are fed up with the tone of the debate.

The partisanship we saw immediately after the shootings is not something that the American public feels comfortable with. So they have decided to i team up one Republican with one Democrat and have them sit together.

That is the theme of the night. Both sides, at least for an evening, will try to find common ground. Obamas speech is shot through with testimonials to compromise and working together. He has been doing that since the election. He has brought corporate executives into the White House. He is channelling Ronald Reagan. The legacy of the Tucson shootings a few weeks ago.

Almost everyone of the Cabinet members are is wearing black and white ribbons on their lapels in deference to what happened in Tucson.

To what extent Katty are we seeing the effects of Tucson? Promises of bipartisanship Barres and as apple pie and ice cream. And usually the promise expires after 32 seconds.

Partisanship is more the norm in Washington. Tonight everyone is making a big effort. There will be the empty seat of congresswoman Gabrielle Giffords. She is not dead tonight but there will be an empty seat for her and the President will PGY pay tribute to her. The promise of this partisanship staying will be whether the parties decide it is in their best interest.

501

Trending
State of the Union
Thundercats
Moscow
Wikileaks
Arizona
Tunisia
Floods
Google Custom TV
Discover
Shared 502, 503

Rickie Gervais Golden Globe Scandal

Liverpool vs Man u highlights

Audi R8 reviewed in Top Gear

Muse Live at the Channel 4 Music Awards

TRON
Tron reviewed on the Culture Show

Oscar Award Nominations

FIG. 8

BOXFISH

Trending on Television

1. draft
2. obama
3. romney
4. immigration
5. apple
6. fed
7. secret service
8. andrew luck
9. john edwards
10. jimmy fallon

---

"draft" — EDIT

ESPNHD SportsCenter
Time now for the "tones light cold hard facts" all six of these as you might imagine about the first round of the Nfl draft.
>> I liked the pick by...
30 seconds ago NFL Network HD NFL Total Access
>> How many teams has jerry jones made a trade on draft day.
>> More than once?
>> Think multiple. 59 trades on draft day or draft days over...

ESPN News Highlight Express
An extra fourth-round pick then they come

---

SEARCH
Discover new TV. Enter a keyword, we will let you know as it is mentioned

---

"romney" — EDIT xxxxxx Early Start
Governor Romney and the president both agree on federally subsidized loans shouldn't be raised to 8.9%. A lot but should stay at 3.4%. A lot of talk about education, higher FOX Business News Best of Imus in the Morning
>> Imus: xxx will not be on the business, then, of suggesting who Romney should pick?
>> Guest xxx don't care who he picks.
>> Imus: I like Miller, but I don't think...

MSNBC The Rachel Maddow Show
The fact we have vice president Biden making a ...

---

"draft" — EDIT

MSNBC The Rachel Maddow Show
We've been in a busy season for recalls these days. Russell Pearce, head of the Arizona State Senate who rammed through the Arizona immigration papers please...

Turner Network TUHD Law & Order
Immigration says Mrs. Shelby was in New York at the time of David's death. She and David had flown from Mexico City. (xxx during their visit David Shelby died of an...

CSPAN2 Today in Washington
The reason is the immigration provisions that we said previously...

FIG. 9

FIG. 12A
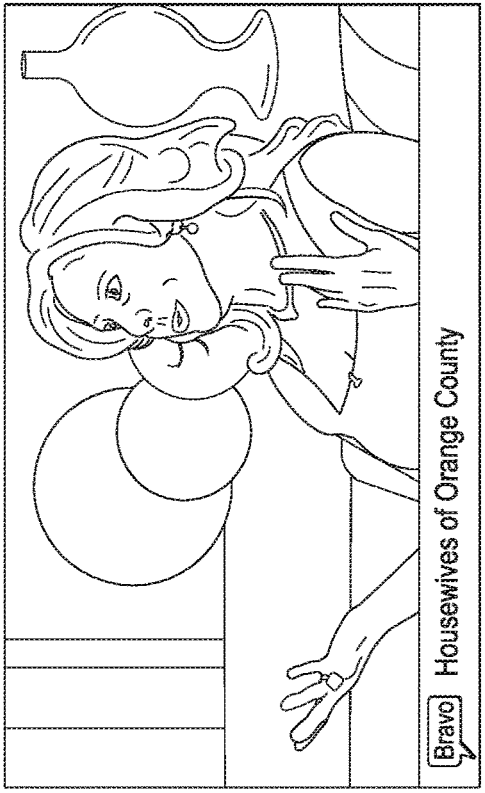
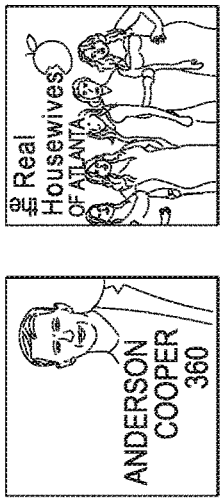
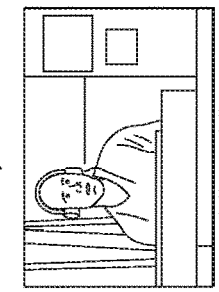
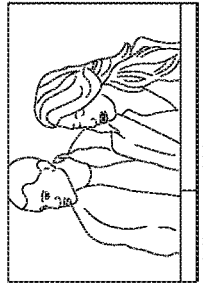
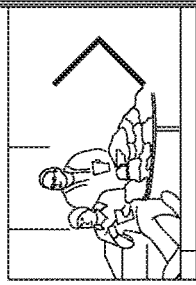
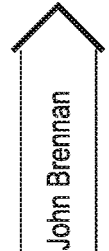
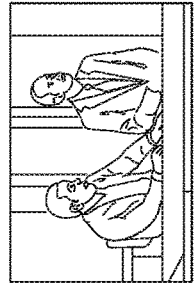
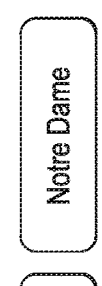
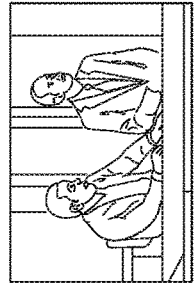
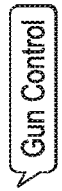

FIG. 12B

Channel:
Comcast Sportsnet Mid-Atlantic
NBC Sports Network
Science Channel
SNBC
SPEED Program:
JFK Jr.'s Final 24
Hunter S. Thompson's Final 24
M*A*S*H
MTV2's Guy Code Mentions:
signing day
signature recipe
sestito
shareable pool
southern mississippi

KEEPING UP WITH KARDASHIANS

Live Mentions of keeping

TOPICAL CONTENT SEARCHING

CROSS-REFERENCE TO RELATED APPLICATIONS

This application is a continuation of U.S. patent application Ser. No. 14/148,552, filed Jan. 6, 2014. Application Ser. No. 14/148,552 claims priority to U.S. Provisional Patent Application No. 61/749,889, filed on Jan. 7, 2013, and entitled "Real-Time Television Monitoring, Tracking and Control System." Also, application Ser. No. 14/148,552 is a continuation-in-part of U.S. patent application Ser. No. 13/840,103, filed on Mar. 15, 2013, and entitled "Self-Learning Methods, Entity Relations, Remote Control, And Other Features For Real-Time Processing, Storage, Indexing, and Delivery of Segmented Video." Application Ser. No. 13/840,103 claims priority to U.S. Provisional Patent Application No. 61/749,889, filed on Jan. 7, 2013, and entitled "Real-Time Television Monitoring, Tracking and Control System." application Ser. No. 13/840,103 also claims priority to U.S. Provisional Patent Application No. 61/639,829, filed on Apr. 27, 2012, and entitled "Self-Learning Methods, Entity Relations, Remote Control, And Other Features For Real-Time Processing, Storage, Indexing, and Delivery of Segmented Video." Each application is herein incorporated by reference in its entirety.

This application relates to and adds additional features to commonly assigned U.S. patent application Ser. No. 13/436,973, and PCT Application No. PCT/US12/31777, both filed on Apr. 1, 2012, and entitled "System And Method For Real-Time Processing, Storage, Indexing, And Delivery Of Segmented Video," which applications are hereby incorporated herein by reference in their entirety.

TECHNICAL FIELD

The present disclosure relates generally to systems and methods that provide for indexing, storage, and access to video broadcasts and to control of television or other video devices using such indexed and presented information.

BACKGROUND

Broadcast television is a constantly changing medium with linear programming schedules. Multiple forms of recording devices exist to satisfy a consumer's need to record selected programming at their own convenience, but many require consumers to know in advance what programming they want to record. Programming that has not been recorded cannot be viewed later.

Broadcast television is localized by satellite, cable, or antenna coverage. Even though content partnership between networks is common, the delivery is still regional.

Internet Protocol television (IPTV) solutions are emerging to deliver content 'on demand' by exploiting the internet as a global delivery medium, but the large cost of bandwidth and streaming services for long form content delivery, coupled with licensing costs and restrictions, hamper wide scale distribution.

There are also infrastructure and development costs for creating such delivery platforms. These costs mean that a company must either have large-scale user numbers or introduce premium content to attract the audience and generate a viable income.

User generated content sites such as YouTube have begun to attract the attention of content producers as a medium for delivery, in particular, time-sensitive content such as news broadcasts. These sites go some way in providing content to users in a timely manner, but indexing is driven by manually generated program titles, descriptions, tags, and other processes that cause delays. For news information in particular, the absence of video content within a search engine's 'real-time results,' is an indication of a problem in this process—in particular when the story has already been aired, but a user must wait for someone to manually add the story so that it can later be watched.

Video advertising remains largely rooted in its broadcast television foundations. Advertising is based largely on broad channel or program demographics rather than explicit information about a program's content. On the internet, text-based advertising such as Google Adwords has proven to be more valuable with context-sensitive advertising.

While the increasing use of mobile devices delivers an emerging base of consumers, traditional long-play program formats are poorly suited to these users and their devices. Several formats have been defined and deployed for delivery of television streams to mobile devices. These formats, such as Digital Video Broadcasting-Handheld or DVB-H, are focused on replicating the television experience on mobile devices. But they do not address the more common use cases for mobile devices, which favor short-form content.

Furthermore, current systems are often unable to identify meaningful things that are mentioned in TV. Disclosed embodiments thus further address the problem that television systems are inefficient in that current TV program guides are designed and laid out as a spreadsheet that previews 30 minute or hour-long blocks of programming. A user must scroll through and filter these options in order to find what they want to watch. These blocks give them no understanding of what the program is actually about. Perhaps a brief description is provided, but they do not necessarily know what is being talked about in the program. For example, Sports Center talks about all sports, so a user who is only interested in Saint Louis Cardinals has no idea if something relevant to their interests is being spoken about at any given time. And because the Cardinals is a very specific subject that is not likely talked about a majority of the time, a user is more likely to miss a discussion about his or her topic of choice than to get lucky and tune in at the exact time the Cardinals are being talked about.

This problem translates to many different genres of television. Current TV program guides do not inform users of what celebrities are being featured on a show, or what specific news stories are being covered. Disclosed embodiments address the problem with current TV program guides, which is that a user must know what they want to see in order to find it.

SUMMARY

An embodiment of the system disclosed in this specification can process data in real-time and output the processed data to client applications, wherein the system comprises: a capture platform that captures data from a data source and generates a stream of text from the captured data; a text decoding server that extracts individual words from the stream of text; an entity extractor that identifies entities from the individual words; a trending engine that outputs trending results based on how frequently each entity is mentioned in the stream of text; and a live queue broker that filters the trending results according to preferences of the client applications and outputs the filtered trending results to the client applications.

In another embodiment, the entity extractor further identifies how often each entity co-appears with other entities in the stream of text. The entity extractor may further create an entity network graph based on how often each entity co-appears with the other entities in the stream of text, wherein the entity network graph is updated in real-time.

In another embodiment, the entity extractor identifies the entities from the individual words by determining their word type. In the present embodiment, the entity extractor may further identify patterns of the word types relating to the words in the stream of text. The word type of each word may be a noun, verb, adjective, adverb, singular, and/or plural. The entity extractor may determine the word type of each word in the stream of text by performing Part-Of-Speech (POS) tagging. The entity extractor may further filter false positives by determining how often the entities appear in the stream of text.

In another embodiment, the entity extractor further normalizes entities that are substantially the same to a common representation. The entity extractor may normalize entities that are substantially the same by analyzing aliases submitted by dictionaries.

In another embodiment, the entity extractor further categorizes each entity. The entity extractor may categorize each entity into a person, place, or thing. In another embodiment, the entity extractor further assigns time-codes, channel sources, and topics to the entities.

In another embodiment, the trending engine calculates trending results based on the rate of change of frequency of mentions versus historic and normalized frequency of mentions globally and across other subsets including channels, programs, and program genres. The trending engine may store the trending results as system wide results, as well as in separate category groups, in a trends database. The separate category groups may be regions, topic groups, and data sources.

In another embodiment, the system further comprises an advertisement recognition component that is operable to identify advertisements from the stream of text. The advertisement recognition component may identify advertisements by keeping track of how often a certain sentence occurs. The advertisement recognition component may further filter the identified advertisements.

In another embodiment, the client application is a website interface, mobile device, and/or television. In another embodiment, the data source is a broadcast, cable, or IP-driven television.

BRIEF DESCRIPTION OF THE DRAWINGS

For a more complete understanding of the present disclosure and its advantages, reference is now made to the following description taken in conjunction with the accompanying drawings, in which like reference numbers indicate like features.

FIG. 5 illustrates an example of a web client;

FIG. 8 illustrates an example of a website interface employing a SLEN system;

FIG. 9 illustrates an example of a mobile device implementation employing the SLEN system;

FIG. 12A illustrates an example of a TV home screen in accordance with the presently disclosed systems and methods;

FIG. 12B illustrates an example embodiment of a TV employing an autocomplete feature;

FIGS. 16A-16C illustrate an architecture and user interface examples related to the Enhancement Engine, in accordance with the presently disclosed systems and methods.

FIG. 17 illustrates another example of a user interface with a tiled view;

Various trademarks or marks are depicted within the drawings. These trademarks or marks are registered trademarks and/or the property of their respective owners.

Although similar reference numbers may be used to refer to similar elements for convenience, it can be appreciated that each of the various example embodiments may be considered to be distinct variations.

The present embodiments will now be described hereinafter with reference to the accompanying drawings, which form a part hereof, and which illustrate example embodiments which may be practiced. As used in the disclosures and the appended claims, the terms "embodiment" and "example embodiment" do not necessarily refer to a single embodiment, although it may, and various example embodiments may be readily combined and interchanged, without departing from the scope or spirit of the present embodiments. Furthermore, the terminologies as used herein are for the purpose of describing example embodiments only, and are not intended to be limitations. In this respect, as used herein, the term "in" may include "in" and "on," and the terms "a," "an," and "the" may include singular and plural references. Furthermore, as used herein, the term "by" may also mean "from," depending on the context. Furthermore, as used herein, the term i/f may also mean "when" or "upon," depending on the context. Furthermore, as used herein, the words "and/or" may refer to and encompass any and all possible combinations of one or more of the associated listed items.

DETAILED DESCRIPTION

Search engines often fail or have difficulty in identifying meaningful words and phrases in television (TV) conversations, such as detecting words like "President Obama" or "Lady Gaga." A self-learning entity network (SLEN) system solves this problem by automatically recognizing entities and determining their relationships with each other. For example, once the SLEN system identifies entities "President Obama" and "White House," it can further learn that the two entities "President Obama" and "White House" are associated with each other. This feature may be used in various technologies and features described below, such as Sentiment/Word cloud and search query reformulation.

Figure 1:
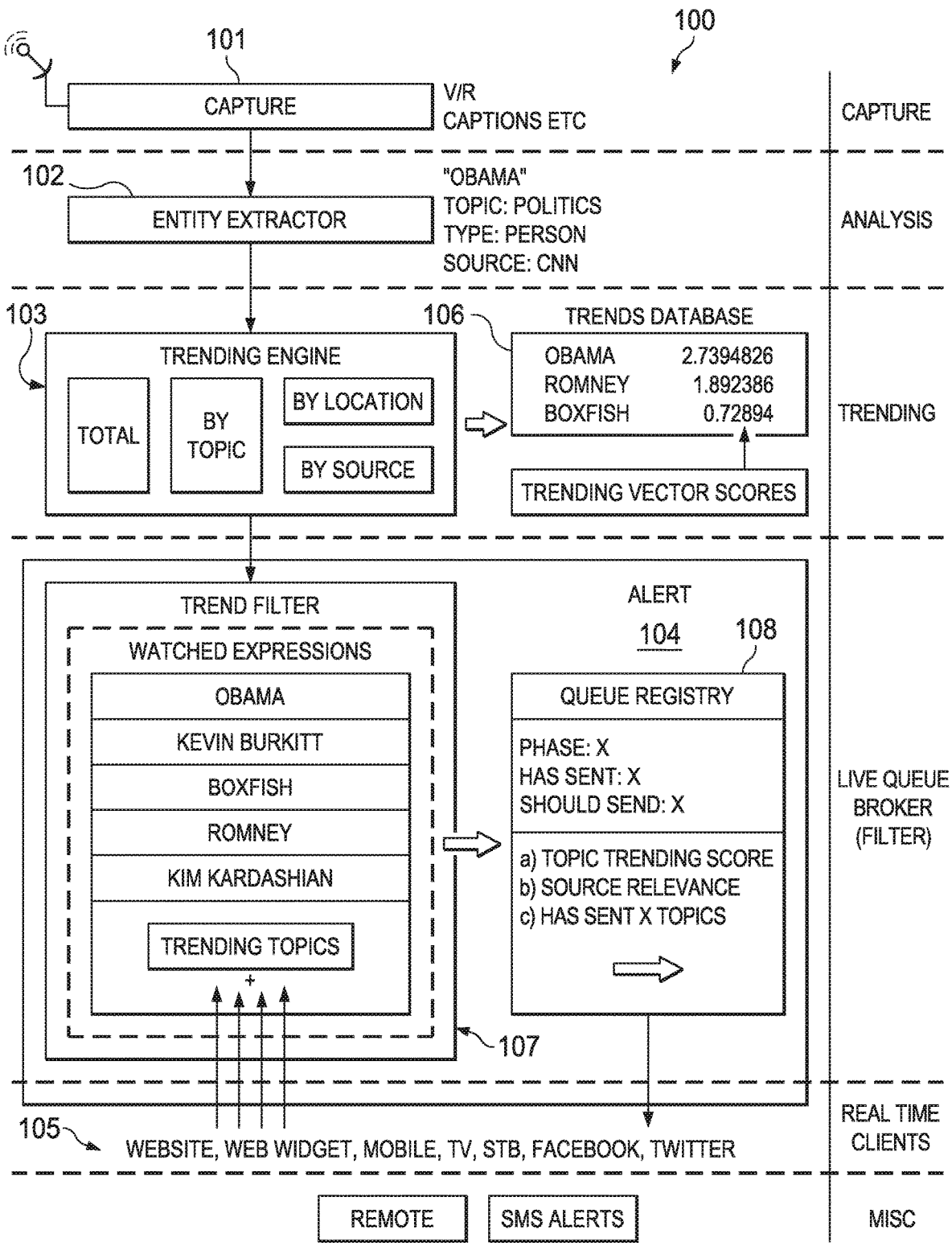
FIG. 1 illustrates an example embodiment of a system in accordance with the principles of the present disclosure capable of detecting and delivering trend information.

FIG. 1 is an embodiment of a system 100 according to the principles for the present disclosure, capable of different functionalities such as trending. The system 100 comprises a Capture Platform 101, an Entity Extractor 102, a Trending Engine 103, a Live Queue Broker 104, and client applications 105. The Capture Platform 101 captures source data from incoming video broadcasts and converts the source data into a standardized format. It may further include a Capture Server (not shown) that is deployed to local geographic regions and gathers the source data. The Entity Extractor 102 processes data using semantic and grammar processing, key term searches, input from EPG and Neilson Data, information from a Contextual Database, and other sources of information.

As a part of the Entity Extractor 102, this data processing can also include using the entities extracted by the Entity Extractor 102 to extract more general topics. Thus, in this embodiment, a topic is more general than an entity, wherein the topic is extracted based on the entity information. In another embodiment, however, a topic may be the same as an entity. The configuration and/or operation of the entity extractor and the nature of the topics extracted may be adapted according to the end application that is being produced. The systems and differing applications in which those topics will be used and presented are further described in other figures of the present disclosure. For example, adverts may be handled or parsed differently in this entity extraction process and/or multiple groups/categories/types are generated such that different end applications can effectively use the extracted topics.

The Trending Engine 103 may be connected to a trends database 106, and the Live Queue Broker 104 may comprise a trend filter 107 and a queue registry 108. The client applications 105 may be a web site, web widget, mobile, TV, Facebook, Twitter, or other suitable applications and devices employed by a client. These components are further described in U.S. patent application Ser. No. 13/436,973, and PCT Application No. PCT/US12/31777, both filed on Apr. 1, 2012, and entitled "System And Method For Real-Time Processing, Storage, Indexing, And Delivery Of Segmented Video," as well as copending U.S. patent application Ser. No. 13/840,103, filed on Mar. 15, 2013, and entitled "Self-Learning Methods, Entity Relations, Remote Control, And Other Features For Real-Time Processing, Storage, Indexing, and Delivery of Segmented Video," all of which are hereby incorporated by reference in their entirety.

Figure 2:
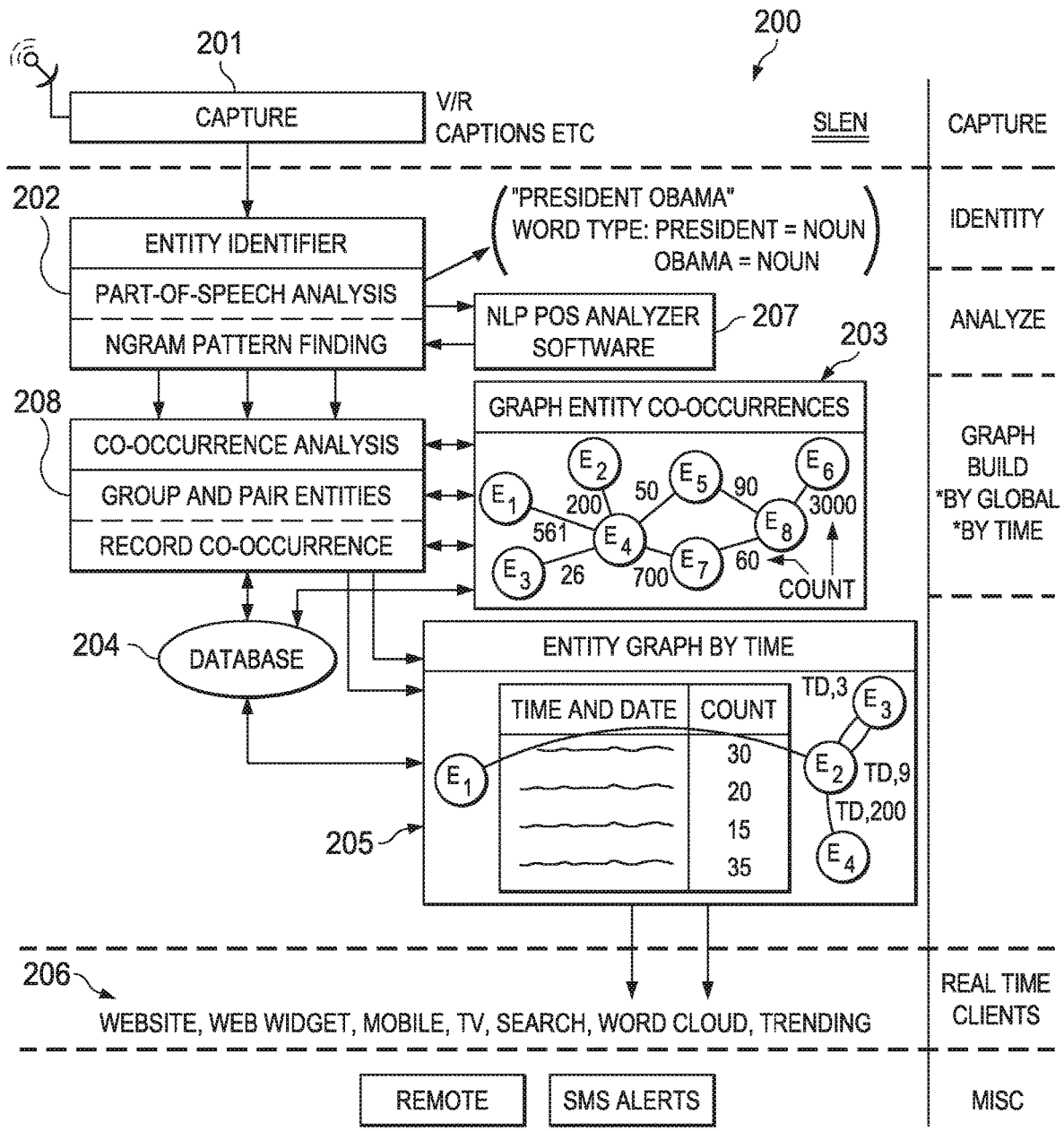
FIG. 2 illustrates an example embodiment of a Self-Learning Entity Network (SLEN) system that generates an entity network graph.

The system 100 is closely related to the SLEN system. FIG. 2 is an embodiment of the SLEN system 200. In an embodiment, the SLEN system 200 shares a number of components with the system 100. Furthermore, components of the SLEN system 200 may provide similar functionalities as some of the components of the system 100 as they may be relatedly employed. In another embodiment, the SLEN system 200 may be a sub-system of the system 100 or of a system larger than the system 100.

I. Data Flow

An embodiment of the SLEN system 200 is operable to recognize entities, further determining whether an entity is a person, place, or a thing. The SLEN system 200 overcomes a previously unrecognized challenge by recognizing new names on TV involving people who have not been previously mentioned. And this ability feeds into a search engine, trending engine, and infrastructure of at least some of the disclosed systems. The SLEN system 200 also enables the Enhance Events and improved DVR functionality described hereinafter.

The SLEN system 200 is thus designed to learn what it hears on TV. It "listens" to conversations on TV and extracts entities or meaningful people, places, objects, and things of that nature from massive volume of data that flows through the TV. The data is processed in real-time, flowing from a data source to the client applications 205. Data flow can be generally divided into the following stages:

A. Capture

In an embodiment, data from the data source is captured and processed to generate a stream of text representing the words being spoken. In an embodiment, the Capture Platform 201 performs this task. The data source may be a broadcast, cable, or IP-driven TV broadcaster, including content streamers or other types of content distributors. The words may be supplied as a subtitle/caption stream or may be decoded from the incoming broadcast using voice recognition. Outputs of the capture process include text phrases and their related time codes and channel sources. In an embodiment, the Capture Platform 201 performs substantially the same as the Capture Platform 101 of the system 100 as was previously described.

Processing

, the captured data is processed, wherein the processing further involves entity recognition, normalization, and categorization. In another embodiment, the processing may further involve augmentation.

1. Entity Recognition

An embodiment of the SLEN system 200 identifies entities in a sentence to determine which parts of the sentence are important. For example, the SLEN system 200 is operable to identify the main subjects in the sentence. In an embodiment, the entities are determined by an Entity Identifier 202. FIG. 2 illustrates that an embodiment of the SLEN system 200 employs the Entity Identifier 202. The Entity Identifier 202 may employ various statistical Natural-Language Processing probabilistic models to perform Part-Of-Speech (POS) tagging, which allows the SLEN system 200 to identify the important parts of a sentence. The POS tagging receives the sentence, analyzes it, and determines the type of each word (word type) in the sentence. Thus, it determines whether each word is a noun, adjective, adverb, verb, singular, plural, etc. In an embodiment, the Entity Identifier 202 may further employ Natural-Language Processing POS analyzer software 207 to perform this task.

An embodiment of the SLEN system 200 then performs a second phase of analysis where it identifies important patterns of word types in order to determine N-grams. For example, "President Obama" has the word types "Noun Noun." At this stage the identified word patterns probably correspond to N-grams and entities in the sentence. Generally, nouns in a sentence are recognized as entities. For example, in a sentence "Barack Obama was in London today," words "Barack," "Obama," "Barack Obama," and "London," are recognized as entities. In another embodiment, the Entity Identifier 202 may work substantially similar to the Entity Extractor 102.

However, the identified entities may be false positives, which are entities that appear to be meaningful, but are not. An embodiment of the SLEN system 200 thus determines whether entities are proper entities by tracking how often each entity appears across all conversations captured from the incoming streams. An entity that is often found has a very high probability of being a proper entity, while an entity that is rarely identified has a lower probability of being a proper entity. This phase of analysis extracts all the entities from a block of text, such as a sentence, paragraph, or TV program. Then it may pair each entity with all other entities in the block of text, e.g. "President Obama" was mentioned with "White House," "Mitt Romney," and/or "Michelle Obama." "Mitt Romney" was mentioned with "White House," "Obama," etc. Pairing can be overlapping or non-overlapping, e.g., the three words "President Barack Obama" can form the overlapping entities "President Barack," "Barack Obama," and "President," or they can form a single non-overlapping entity "President Barack Obama."

2. Normalization

Dictionary databases provide keys and aliases for common entity representations. In an embodiment, a number of dictionaries are present in a Contextual Database. Online resources are often used to generate dictionary content. Thus, dictionary databases may provide keys and/or aliases specifying that, for example, "Barack Obama," "President Obama," and "President of the United States" all refer to the same entity. An embodiment of the SLEN system 200 detects these key phrases and normalizes them to a common representation. For the aforementioned examples, the key phrases could then be normalized to "Barack Obama."

3. Categorization

In an embodiment, dictionary representations also attach topic context when known to help determine ontologies of the discovered entities. An example would be "Barack Obama" being a politician, and more generally a person, and "London" being a city in Europe, and more generally being a location.

II. Entity Relationing

Still referring to FIG. 2, as shown in the figure, a processor 203 in a final phase of the analysis builds a large entity database demonstrating entity relationships. The entity network relationships are continuously updated in real-time as new sentences are captured by the Capture Platform 201. A database 204 stores a frequency count of how often two entities co-occur (occur in a same block of text) in order to construct the entity database 203. In an embodiment, this is performed by a co-occurrence analysis component 208. In an embodiment, the co-occurrence analysis component 208 may group and pair entities, and further record co-occurrences. A frequency count gets updated when two entities co-occur. This produces a large relationship mapping stored in the database 204, showing how entities are connected to each other in numerous ways. In an embodiment, the SLEN system 200 comprises an entity graph by time 205 that is maintained by keeping track of the counts by time and date. Thus, in an embodiment, the entity graph by time processor 205 accesses the database 204 to perform entity relationing. In another embodiment, the SLEN system may construct other suitable semantic relationship maps using techniques such as Latent-Semantic Indexing and Term-Frequency Inverse Document Frequency (TF-IDF).

For example, "President Obama" is connected to "Mitt Romney" who is strongly connected to "Ann Romney." "President Obama" is also strongly connected to "White House," "President," and many other entities. By continually updating in real-time the entity network graph 203 that shows co-occurrences of different entities, the embodiment of the system learns which entities co-occur and how they are related to each other.

The client applications 206 may be a website, web widget, mobile app, TV, TV set-top box, Facebook, Twitter, or other suitable applications and devices employed by a client. For the purposes of the client, the collection of categories and trends are simplified to a set of categories, defined according to consumer/product interests, such as news, celebrities, politics, sports, etc.

III. Process Output

In an embodiment, a set of entities with associated timecodes, channel sources, and topics are output to the client applications 206 of FIG. 2. For example, Entities:

```
[
    {
        key: "obama",
        type: "person",
        topic: "politics"
    },
    {
        key: "london",
        type: "location"
    },
]
```

IV. Trending

In an embodiment, the SLEN system 200 may be connected to the trending engine 103 of the system 100, which uses historic frequency metrics to calculate and quantify what phrases are being mentioned more frequently than usual. In another embodiment, the SLEN system 200 may itself include a substantially similar trending engine. In an embodiment, trending is performed not simply with historic frequency metrics, but by using other variables and data. In an embodiment, the SLEN system 200 may provide trending functionalities by accessing its entity graph by time 205 or its large entity network map database that demonstrates entity relationships. A percentage increase or decrease of mentions may be balanced against the actual volume of mentions and the spread across the channels in order to produce a score that indicates how 'hot' a topic is. These values are constantly calculated for each word and stored in the trends database 106 or other suitable trending tables. Other embodiments of the trending engine 103 determine trending topics based on other relevant data.

These trending results are calculated and stored as 'system wide' trending results as well as in separate category groups. Thus, as shown in FIG. 1, the system 100 can determine:
  a. What is trending overall on TV;
  b. What is trending in a particular region—such as UK or US;
  c. What is trending within a particular topic group—for example trending in 'politics' or 'sports'; and
  d. What is trending on a particular data source—such as a TV channel.

In an embodiment, these trending functionalities can be performed by the SLEN system 200 that analyzes the entity network map database 203.

V. Live Queue Broker

The primary purpose of this stage of processing is to take global trends and to filter them down to specific data points that client applications are interested in. For example, users may have the live results page open with a query for "Kim Kardashian" and/or other celebrities. In an embodiment, the live queue broker 104 routes relevant mentions of these queries to the client applications 105. Trends that are not being actively followed can be ignored at this stage of processing.

The second purpose of this stage is to algorithmically control the rate at which these notifications are delivered. For example, "Barack Obama" may be mentioned 3,000 times on TV in a day, but it would be inconvenient to send 3,000 alerts for each user on a daily basis. Thus, the present embodiment determines which mentions are significant based on how the phrase is trending overall. This allows a user to know whether a story is significant or "breaking." These calculations also take into account an overall "throttle" so that even if a client is interested in several topics, the client is not bombarded with mentions.

In an embodiment, once items are found to have met a desired threshold, the items are routed to the client application 105. This is dependent on the client's technology, but in described embodiments the routing is via a real-time "push," rather than by a polling process. The live queue broker 104 may be connected to or be a part of the SLEN system 200. One of the client types further disclosed in the present application includes the Enhance Event client devices described in FIG. 16A, which would also be operable to receive data pushed or pulled from the live queue broker. In the context of the Enhance Event client devices, the data sent could include topics, advert indicators, brands detected, hash tags, people, places, programs, organizations, stocks and many other types of topic-related metadata. The specific Enhance Event client devices and system for providing the topic-related metadata to the client will be described further in FIG. 16A.

VI. Exemplary Applications

In an embodiment, it may be desirable to see how often "Obama" is mentioned over time. The present embodiment identifies what words frequently occur with "Obama" (e.g., words that are strongly related to "Obama") and then determines that "Obama" can refer to "President Obama," "Barack Obama," etc. Thus, this information may be used for determining normalization.

An embodiment of the SLEN system 200 improves the accuracy of the trending models created by the system. It also generates the system's transcripts that are displayed. In an embodiment, certain entities are "clickable," so that a user can click on an entity and have access to more information on the entity. For example, if "President Obama" is clicked, the same information would display as if "Obama," "Barack Obama," etc. had been clicked.

Another example is if the word "Apple" is used, the system uses related entries to determine if the "Apple" being referred to is Apple (the company) or apple (the fruit).

Another example is when a user performs a search; the system rewrites the search to incorporate more information than would otherwise appear. For example, if a user searches "Obama," the system references it against the data maps in the database involving the word "Obama," then looks for words with a strong correlation to "Obama," such as "White House" and "President."

VII. Ad Recognition

Figure 3A:
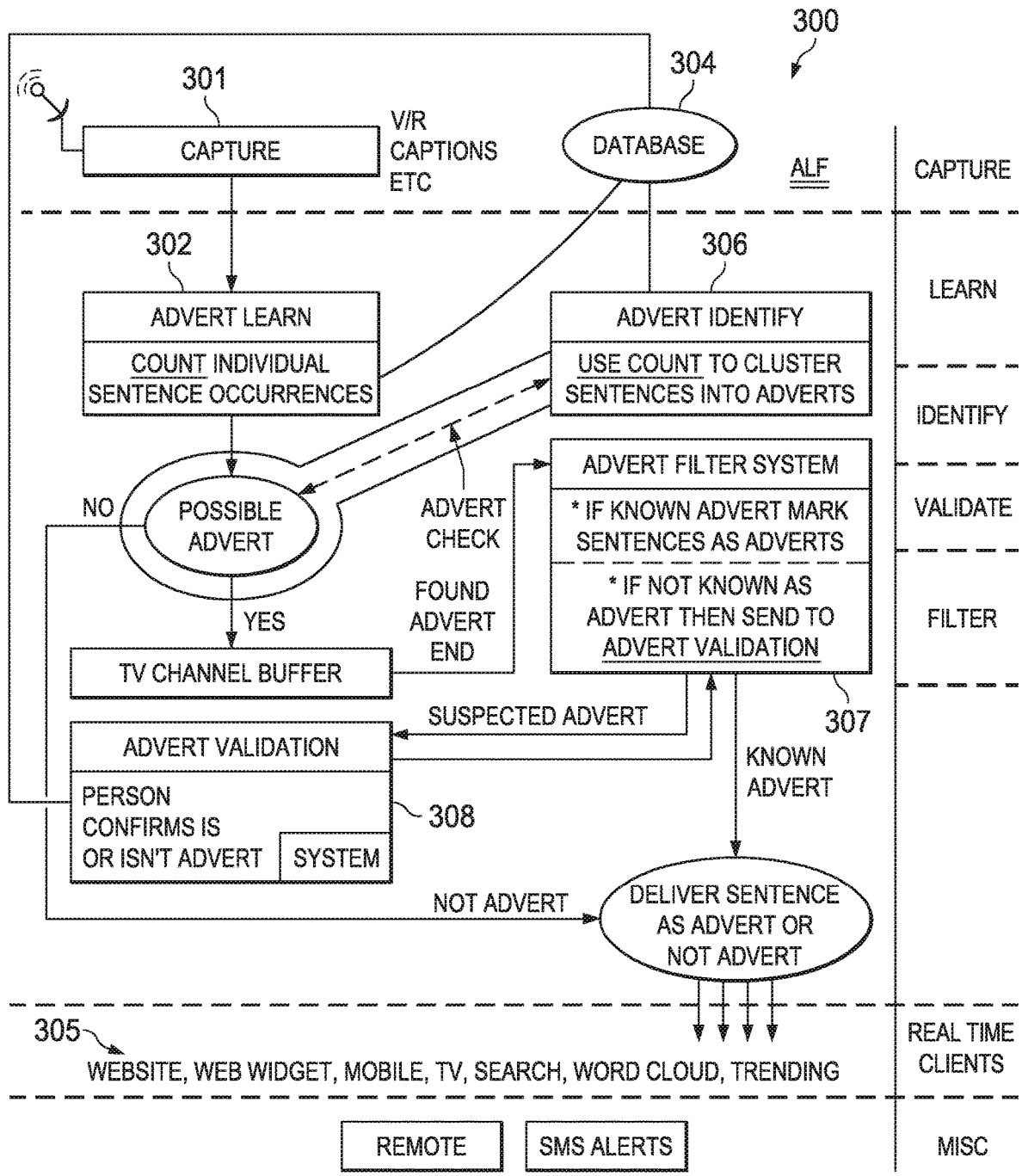
FIG. 3A illustrates an example embodiment of an advertisement recognition system.

It may be desirable for the system to be able to identify adverts (e.g., ads, advertisements, commercials, etc.) to ensure that a user's search does not result in ad content. For example, if a user searches for "Coke," the search would likely result in many Coca Cola ads. FIG. 3A illustrates an embodiment of an ad recognition system 300, in accordance with the other figures described herein, that organizes and identifies ads that run on TV and other data sources so that such ad content can be filtered in a user's search. A Capture Platform 301 captures data from data sources. The ad recognition system 300 may be connected to the SLEN system 200. In an embodiment, the ad recognition system 300 comprises a database 304 to store the recognized ad information along with other information discussed below.

The ad learn component 302 may learn ads by counting individual sentence occurrences, which may be stored in database 304. In an embodiment, a given sentence may be entered as a field in the database 304 and an ongoing count of sentence occurrences may be stored as a value associated with that field. The database 304 may also store linking information about the sentences most frequently occurring immediately before or after a given sentence. In an embodiment, the ad learn component 302 may further be connected to an ad identifier 306 that uses the database 304 to cluster sentences into adverts or potential adverts. The linking information may be used to create Markov models to assist in the detection of ads. In an embodiment, the ad identifier 306 may determine the first and last sentence of an advertisement by utilizing the count information and linking information within the database 304. If the sentence cluster is deemed an advert, an advert filter system 307 may filter the advert. In an embodiment, the advert filter system 307 may utilize a repetition threshold to make that determination. The advert filter system 307 may further be connected to an advert validation component 308, which may be used for potential adverts. A sentence cluster may be deemed as a potential advert when the repetition threshold is not met. At the advert validation component 308, an administrator (admin) may confirm whether recognized data is an ad or not. The advert validation component 308 may also be partially or fully automated, and it may also be connected to database 304. As the database 304 expands over time, the system 300 may improve recognition of individual advertisements, which may then bypass the advert validation component 308 when encountered by the advert filter system 307. The ad recognition system 300 may deliver the captured sentence as an advert or not an advert to the user.

Figure 3B:
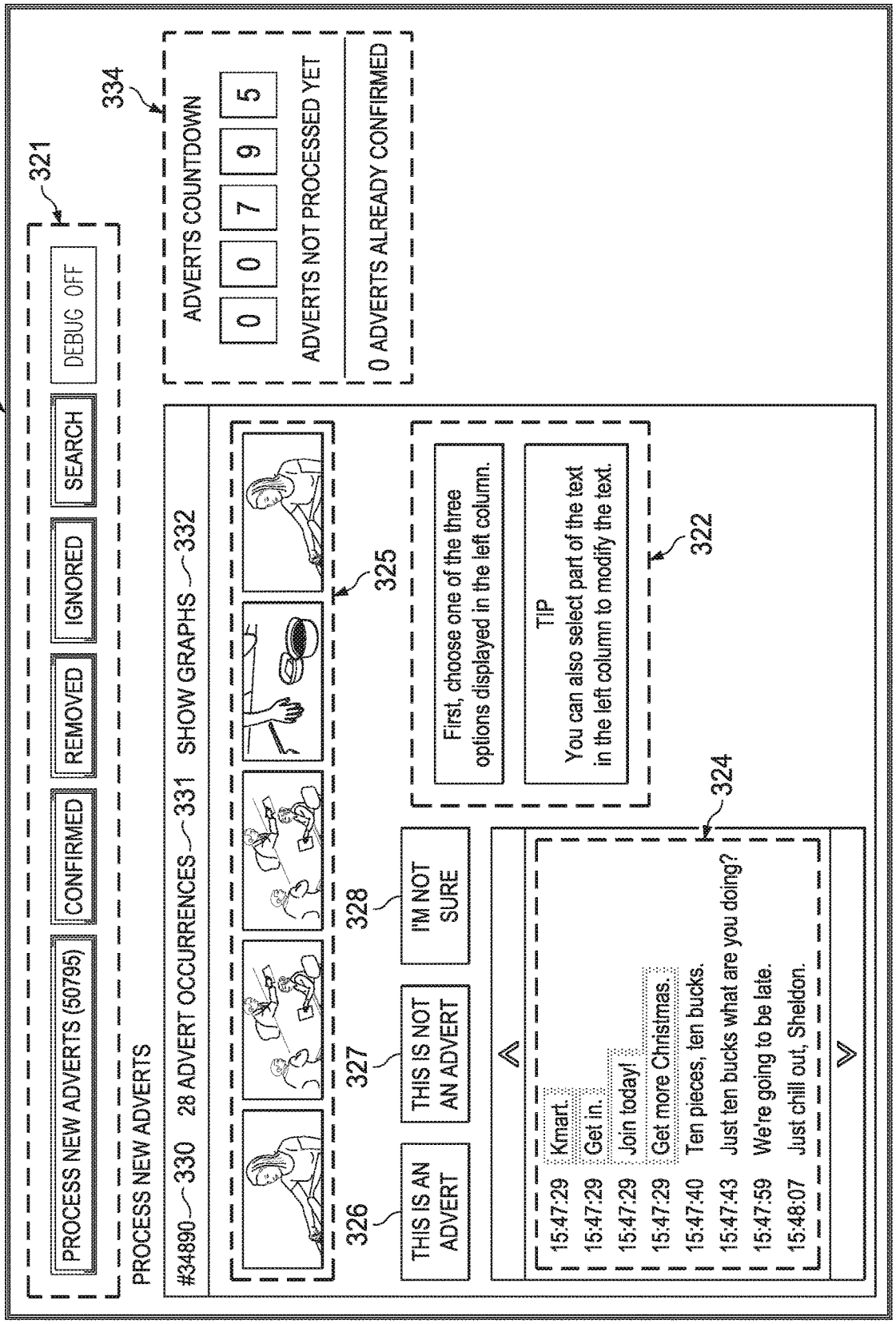
FIGS. 3B-3C illustrate an example embodiment of a user interface enabling advertisement verification and brand identification.

FIG. 3B illustrates an exemplary embodiment of a user interface 320 for advert validation. The interface 320 may include a series of tabs 321 allowing navigation of the interface 320. The tabs 321 may allow an admin to process new (potential) adverts, view processed adverts, and search the database 304 of FIG. 3A for confirmed and potential adverts. The interface 320 may present instruction windows 322 to guide the admin through the validation process. When processing a potential advert, the admin may be presented with detected text of the potential advert as well as surrounding text in scrollable text window 324. The suspected boundaries of the potential advert may be visually indicated. The admin may also modify the text or boundaries of the potential advert in text window 324, and these changes may then be reflected in database 304 of FIG. 3A. The admin may also view a series of still images 325 associated with the potential advert. In an embodiment, the admin may view video content associated with the potential advert. The user interface 320 may also present an identifier number 330 and a occurrence count 331, both of which may be received from database 304 of FIG. 3A. The admin may also elect to view the advert graph database (described below with respect to FIG. 16A). Based on this information, the admin may select button 326 to indicate that the potential advert is an advert, button 327 to indicate that the potential advert is not an advert, or button 328 if he or she is unsure. The user interface 320 may also include a countdown window 334 to help an admin manage his or her workload. The countdown window 334 may include the remaining number of potential adverts for the admin to process as well as the total number of adverts confirmed by the admin.

Figure 3C:
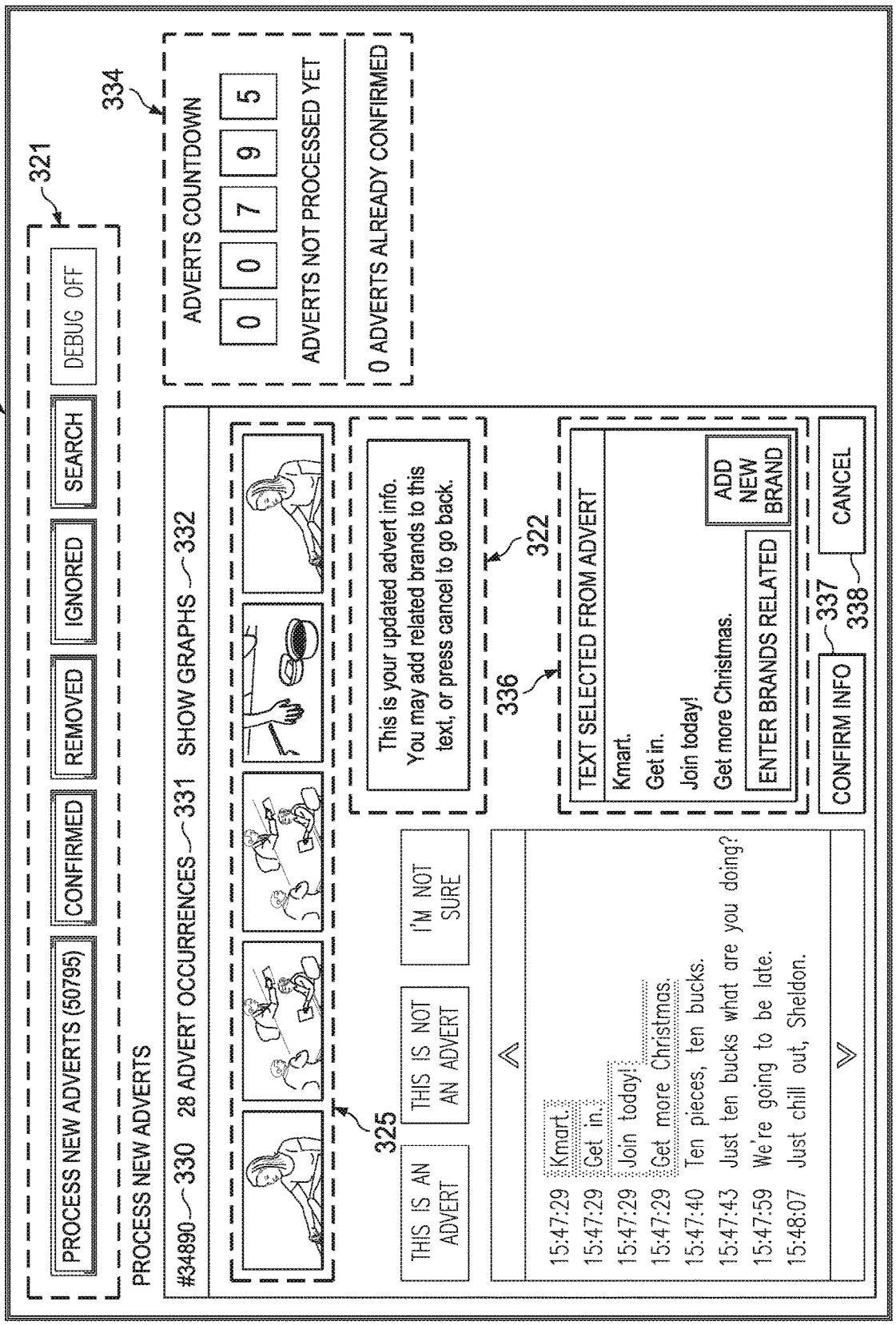

FIG. 3C illustrates a brand identification screen of the user interface 320 enabling brand entry. This screen may occur after the admin indicates that a potential advert is in fact an advert through the process described in FIG. 3B. At this stage, the admin may enter one or more suspected brands in brand entry window 336. An instruction window 322 may be updated to guide the admin through this process, and portions of user interface 320 may be dimmed to draw attention to the brand entry window 336. The window 336 may include text from the indicated advert and may provide a method for entering one or more brands. One such method shown in FIG. 3C is a text box with autocomplete functionality, using known brands stored in a database. The textbox may also be pre-populated based on the similarity of the detected text with text of previously detected adverts. After entering a brand, the admin may elect to add additional brands associated with the indicated advert.

After entering one or more brands, the admin may select the "confirm" button 337 to confirm the advert as well as the associated brand or brands. Upon confirmation, this information may be sent to database 304 of FIG. 3A, and the admin may be presented with another potential advert. Alternatively, the admin may select the "cancel" button 338 to return to the advert validation screen.

Referring back to FIG. 3A, the ad recognition ability can also be useful in reverse—if a user wants to know whether something is mentioned in an ad (e.g. competitors in business or the user's trademark brand), a configured search can identify ad content. The client applications 305 may be a website, web widget, mobile phone or other mobile device app, a smart TV or a TV set-top box, Facebook, Twitter, or other suitable applications and devices employed by a client.

An exemplary ad recognition system 300 can take incoming streams and learn what the ads are. An admin may help recognize flagged ad content. The admin may be a person. In general, the admin can determine if the system is correctly guessing what is and is not an ad. The system is configured to enable the admin to confirm or reject whether a clipped section is an ad or not. If it is an ad, the system files it as an ad and may reference the filed ad when determining, at a later time, whether or not potential ads are indeed ads.

Thus, in an embodiment, the system 300 keeps track of how often a sentence occurs. In normal transcription, most sentences do not occur that often. In an advertisement, however, the same sentence will usually be played at least several times a day on several networks. Each time a sentence is said on a given network, the system 300 may check to see how many times that sentence has been said. If it has been said a lot, for example ten times, the system then checks the next sentence to see if it matches a similar pattern. If it does, the system 300 continues to monitor these sentences. Eventually the system 300 will have stored a database of sentences presumed to be parts of an ad. Once the system identifies an ad, it begins to look for the end of the ad. If a subsequent sentence has been mentioned only three times, then the system 300 can reasonably assume that this is the end of the ad. For example, if an ad is seven sentences long, the system looks at the immediately subsequent sentence in order to determine whether that sentence is or is not part of the ad. The system can use this data in conjunction with timing (e.g., most ads are approximately 30 seconds long) to also determine what phrases are a part of given ads and where ad programming vs. regular programming is occurring.

In an embodiment, the system 300 can then automatically compile the relevant captured ad data and stores that captured data in the database 304. Alternatively, this data can be passed to a human admin for further analysis and/or categorization. In certain embodiments the captured ad data can be associated with brands (either previously known or otherwise recognized) and that association can also be stored in the database 304 for further use and/or metrics analysis.

In an embodiment, the system 300 is also capable of identifying "catch phrases" in ads. For example, Cingular Wireless uses the "Can you hear me now?" line in its ads. The system can recognize that this is a phrase frequently used in ad, possibly even in a particular part of an ad, and can use that to aid in ad identification.

The presently described systems and methods also provide tools for delivering targeted ads to TV viewers. These ads may be implemented as video headers presented to TV viewers alongside standard TV content and/or through "second screen devices" used concurrently by the TV viewers. Numerous other delivery mechanisms may be tailored to work in conjunction with the present disclosure. Furthermore, many aspects of the ad experiences, such as ad duration, may be adjusted over time based on client heuristics.

In an embodiment, words on TV (or other television content broadcast or streaming) are used as keywords that may be sent to an advert exchange marketplace. In this marketplace, a plurality of advertisers may "bid" to deliver ads when certain keywords and/or key phrases are spoken on TV. These ads may be implemented, for example, as video headers presented to TV viewers alongside standard TV content. For example, a clothing company may successfully bid on a keyword or key phrase (e.g., "buy pants") to be presented alongside the TV content. This bidding activity may be recorded and stored in an advert inventory database. Table 1 below shows a sampling of entries that may be stored in an exemplary the advert inventory database.

TABLE 1

| Keyword | Advertiser | CPM |
|---|---|---|
| brand | Murphy's New York | $26.56 |
| brand | Redbug | $26.50 |
| brand | M Brands Ponchos | $26.31 |
| brand | BigDollar Dept. Store | $25.84 |
| designer | Roma Homa Designs | $32.00 |

As shown in Table 1, the advert inventory database may store a plurality of entries, wherein each entry may include a keyword or key phrase, an advertiser, and a bid amount. In an embodiment, the bid amounts may use the metric of a cost per thousand advertising impressions (CPM). This illustrated metric is merely exemplary, however, and other suitable metrics may be used.

The advert inventory database may be queried when a TV viewer is watching TV content. For example, a capture platform may receive the following input during an entertainment news program: "Now Simpson is going to have a chance to teach others how to succeed in the clothing biz. Jess will guide designer hopefuls as they compete for a million dollar contract to start their own brand." The entity extractor or a separate advert-related engine may extract the following keywords and key phrases: "how to succeed," "designer," and "brand." These keywords and key phrases may then be used to search the advert inventory database to determine successful bids by one or more advertisers, and successful bidders would be able to have their ad appear alongside the TV content or on second screen devices when such words or phrases are spoken.

Each successful bid may result in the bidder's ad appearing to a plurality of TV viewers. In the presently described embodiment, the number of ad occurrences may be predetermined, though other types of control may also be used. The system may allow for advertisers to limit the maximum number of ad occurrences to control advertising costs or provide other types of control, such as controlling for suitable geographies and/or time slots, and also to provide different costs that can be scaled according to the time slot, geography, or other suitable metrics.

The advertisers may be presented with an interface to effectively bid on such keywords and key phrases. Such bidding may occur in real time. Other forms of bidding systems may also be used. For example, in an embodiment, advertisers may bid for the exclusive right to display ads to TV viewers during certain TV sequences or the mention of certain keywords and/or key phrases.

Figure 4:
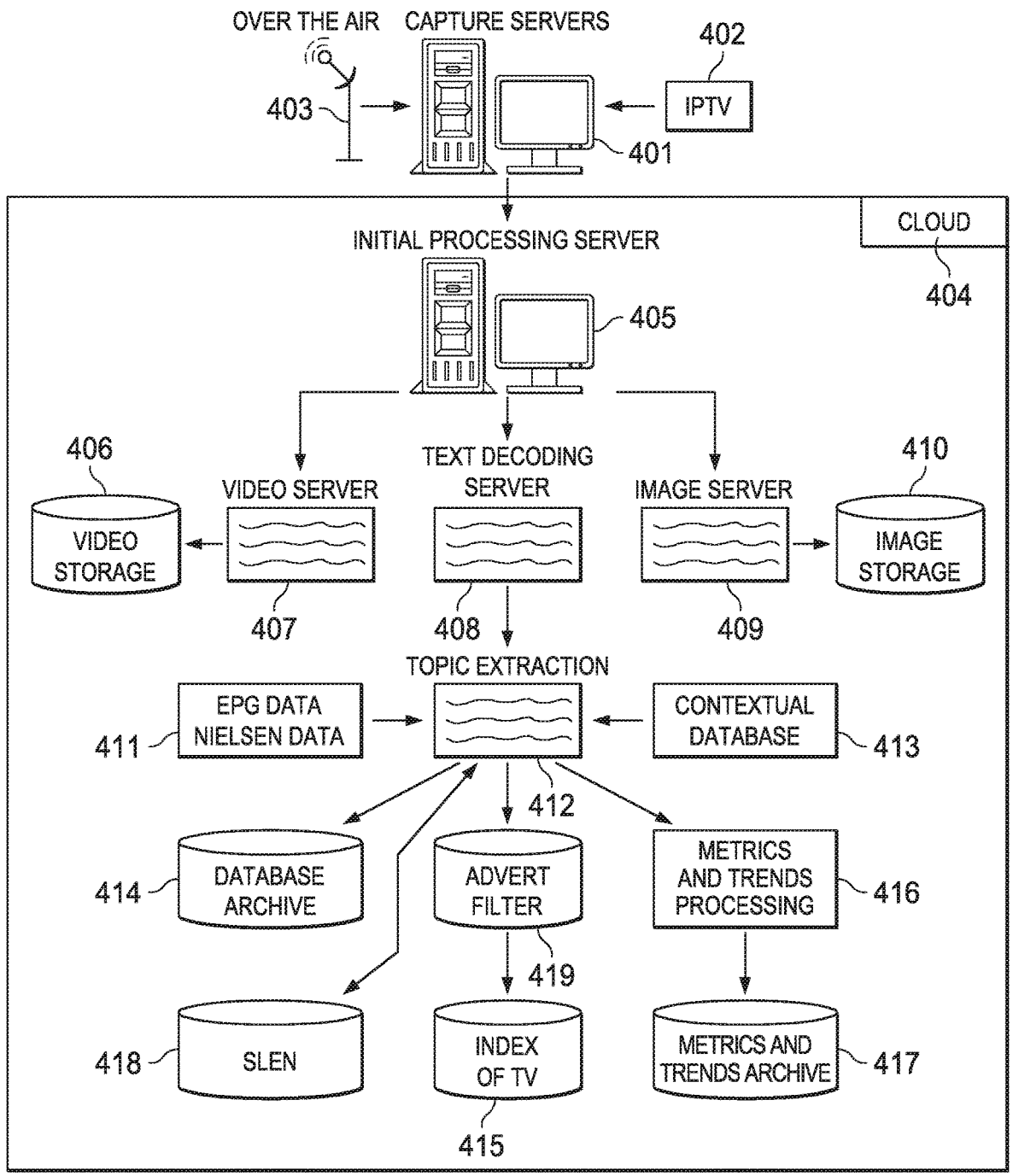
FIG. 4 illustrates an example configuration employing the SLEN system and the advertisement recognition system.

As mentioned, the system for implementing SLEN can be understood in terms of a processing engine, capture platform, and other system elements previously described. FIG. 4 illustrates how the SLEN and ad recognition technology can be implemented in the current system. The system comprises Capture Servers 401, an Initial Processing Server 405, a Video Server 407, a Video Storage 406, a Text Decoding Server 408, an Image Server 409, an Image Storage 410, a Topic Extraction 412, a Contextual Database 413, a Database Archive 414, a Metrics and Trends Processing 416, a Metrics and Trends Archive 417, an Index of TV 415, a SLEN 418, and an Ad Filter 419. In an embodiment, the Capture Servers 401 may capture data with an antenna or through other means from over the air 403. IPTV 402 may be fed into the Capture Servers 401 as input.

VIII. Real-Time Clients

Figure 6:
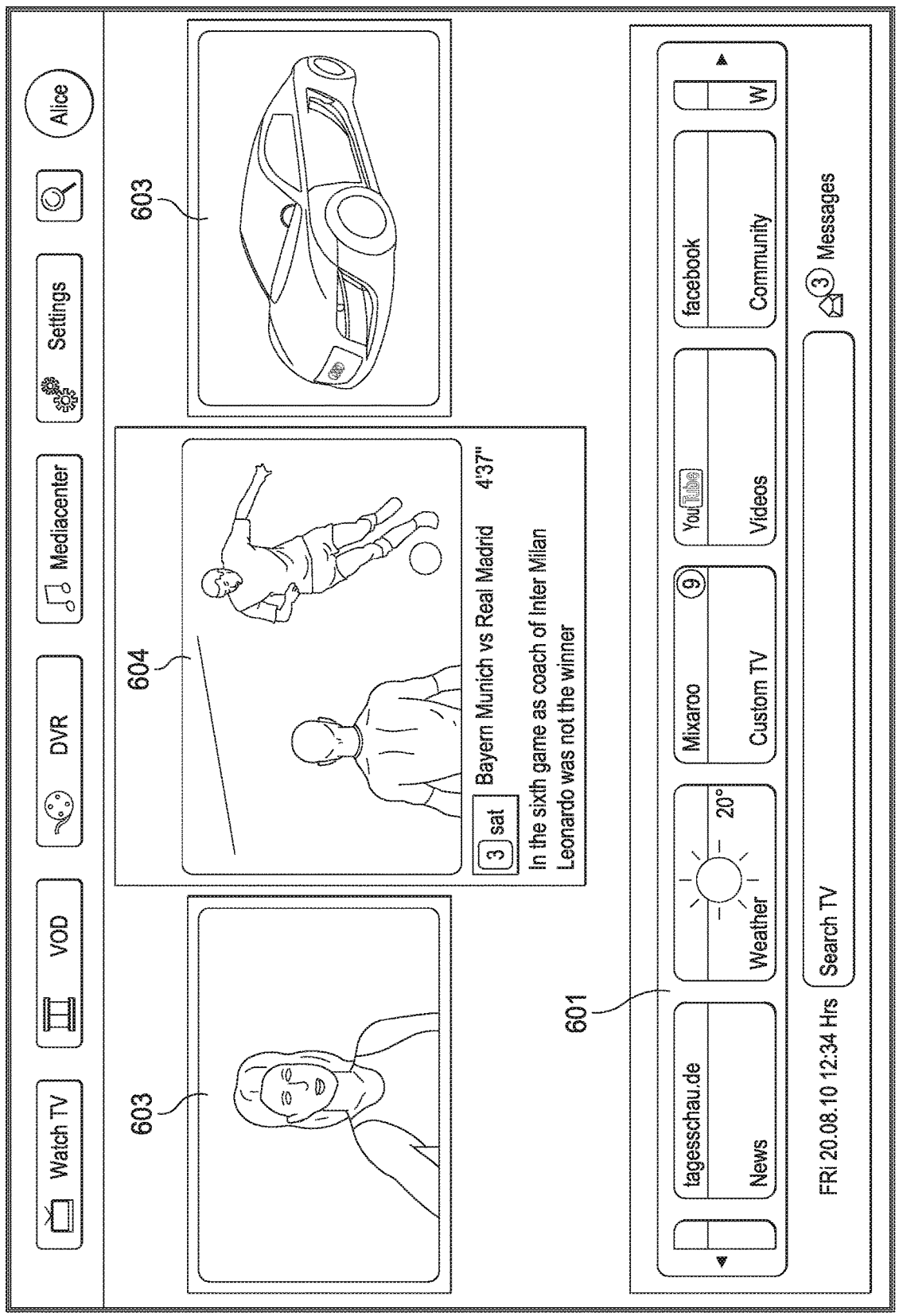
FIG. 6 illustrates an example of an IPTV client.
Figure 7:
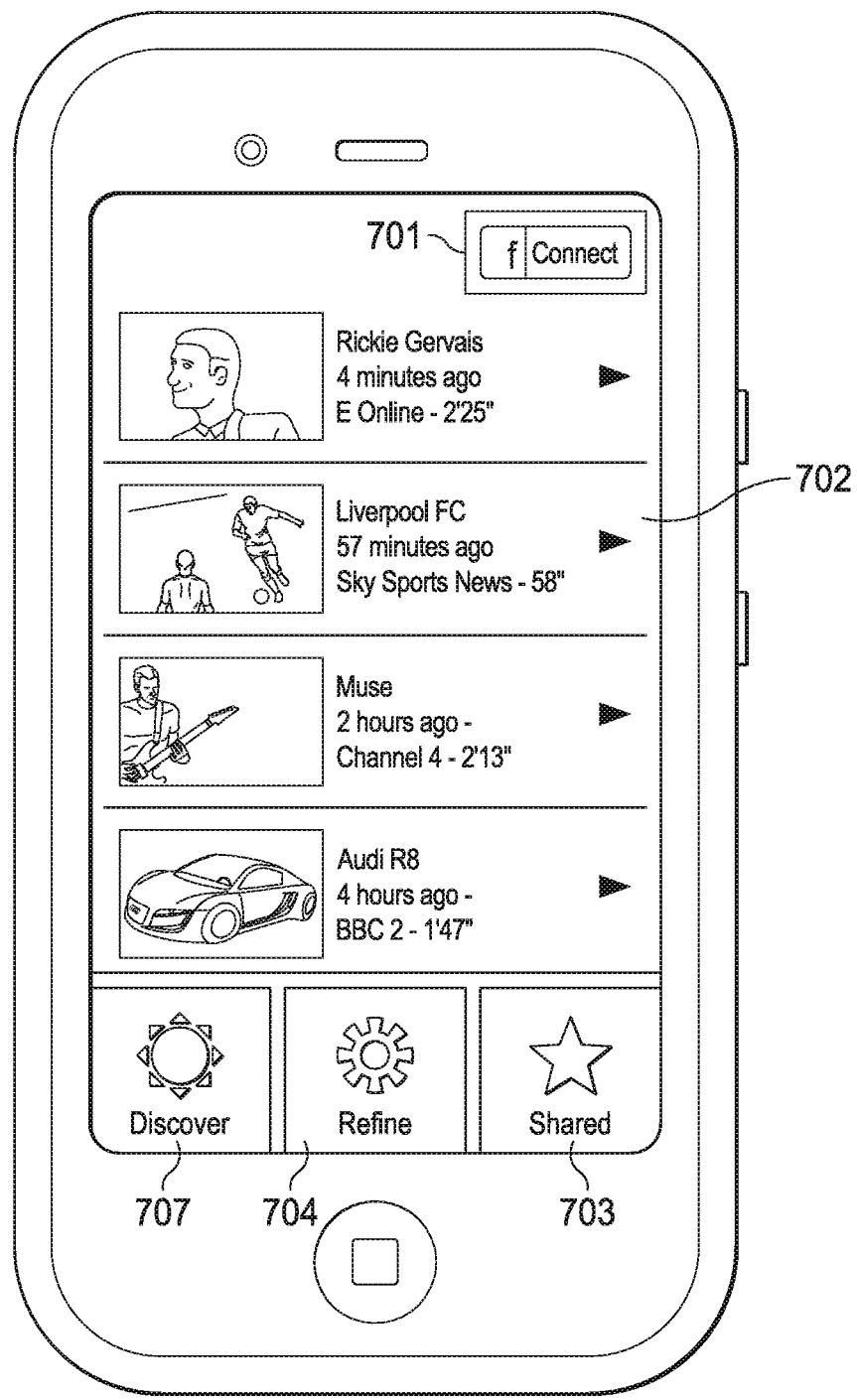
FIG. 7 illustrates an example of a mobile device client.

Multiple platforms can serve as clients to receive trending items. FIG. 5 illustrates an example of a web client interface and its functional components. This interface demonstrates the use of a number of platform elements, such as trending topics 501, custom video queue 502, shared 503, video player 504, transcript 505, and search box 506. Trending topics 501 may be delivered from a Trending Topics engine. The small 'pin' icon next to the 'Trending' title 501 text in this example is described as a location pin. This suggests that the results are local to a user, rather than being a 'global' trending topic. Custom video queue 502 is displayed as a series of thumbnails at the bottom of the page. This is customized to a logged-in user, so it would be replaced with a login button if no user is currently logged in. FIG. 6 illustrates an example of an IPTV client and its functional components. The IPTV interface example displays an "App" Selection 601 at the bottom of the page, and above that, the custom queue of video items to select from. The video thumbnails show the view after the user has connected to their social account to configure their interests, or, like a web-based 'Discover 707' list (shown in FIG. 7), featured/top ranked items for users who are not connected. In an embodiment, a video player 604 is provided in the center. In an embodiment, shared 103 provides a queue format with a number of times an item has been shared in social networks such as Twitter, Facebook, and so forth. FIG. 7 illustrates an example of a mobile client. It displays a custom queue, along with the 'Discover 707' and 'Shared 703' buttons. The 'Connect' button 701 at the top of the example image enables the user to connect using Facebook's Open Graph API as a source for taste graph interests. A 'Refine 704' button at the center of the bottom tab panel is provided to lead to a list of taste graph interests that the user can modify. In an embodiment, a Custom Video Queue 702 is provided, displaying as a thumbnail.

A. Web

FIG. 8 illustrates an example of a web site interface that may be deployed in conjunction with a SLEN system. It serves as a place to view multiple trending topics online. In an embodiment, a list of trending topics is provided on a left column. In this embodiment, some of the trending topics are "draft," "obama," "romney," "apple," "secret service," etc. A keyword may be entered and searched in a box provided in the center of the website.

B. Mobile

Figure 9:
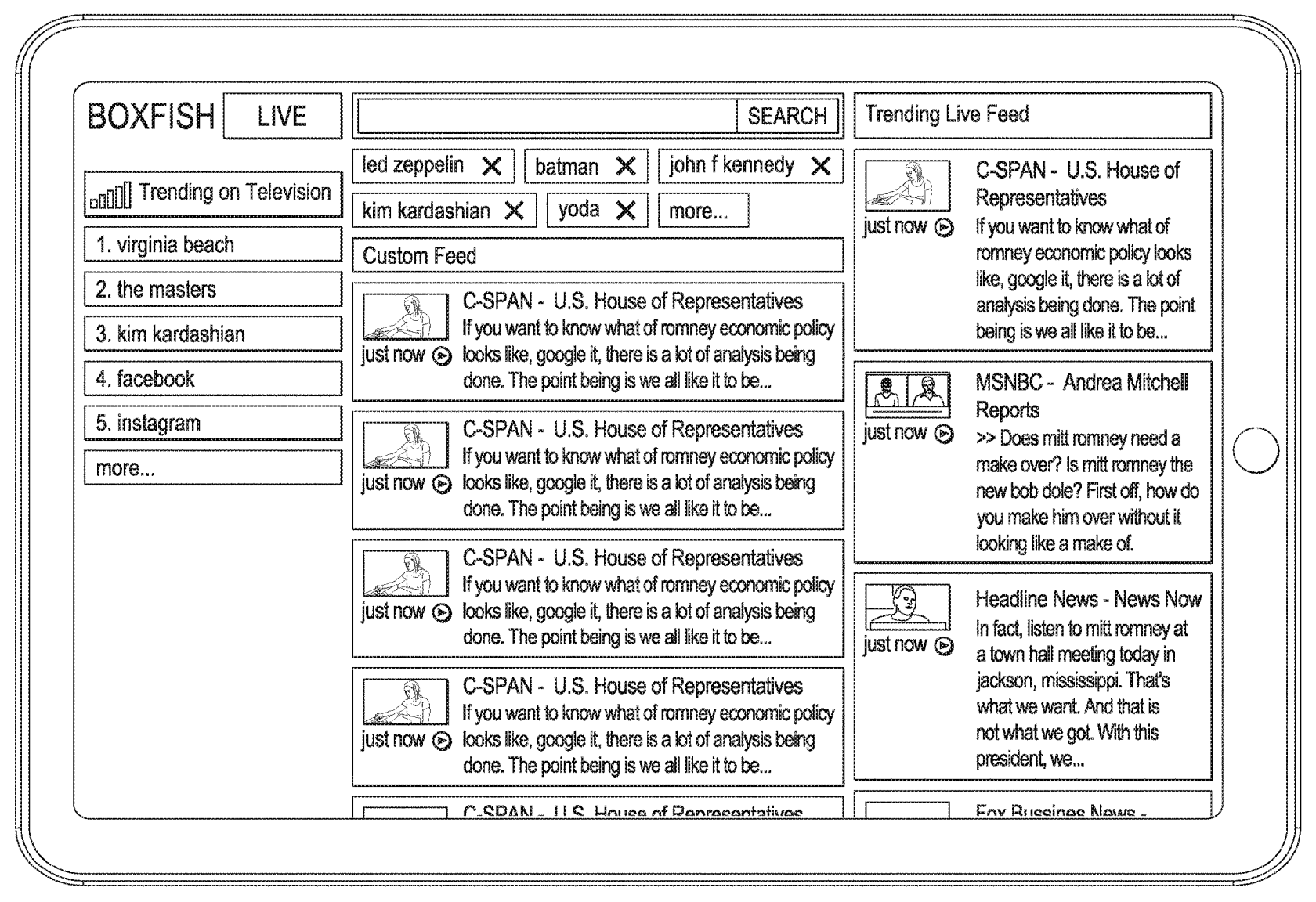
Figure 10:
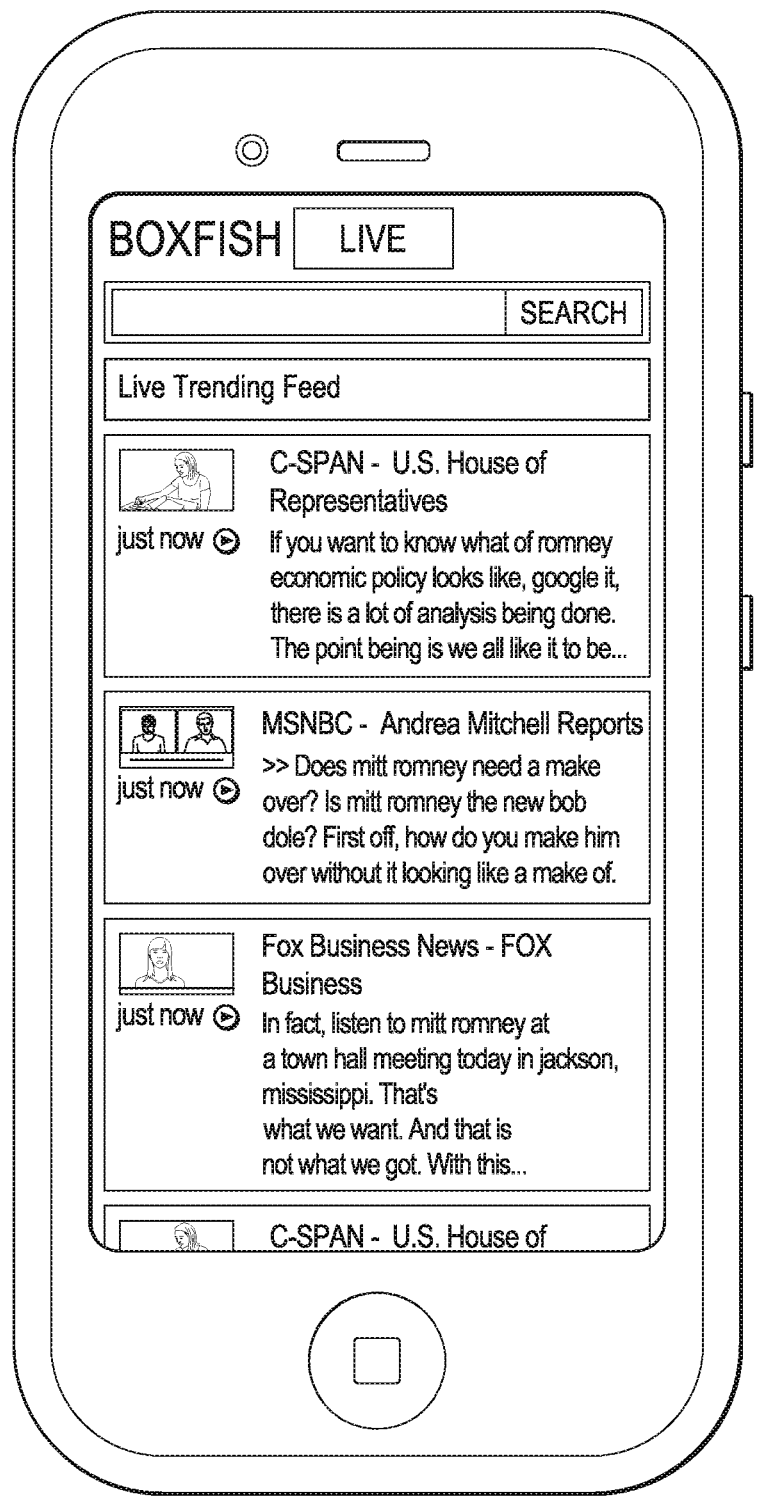
FIG. 10 illustrates another example of a mobile device implementation employing the SLEN system.
Figure 11A:
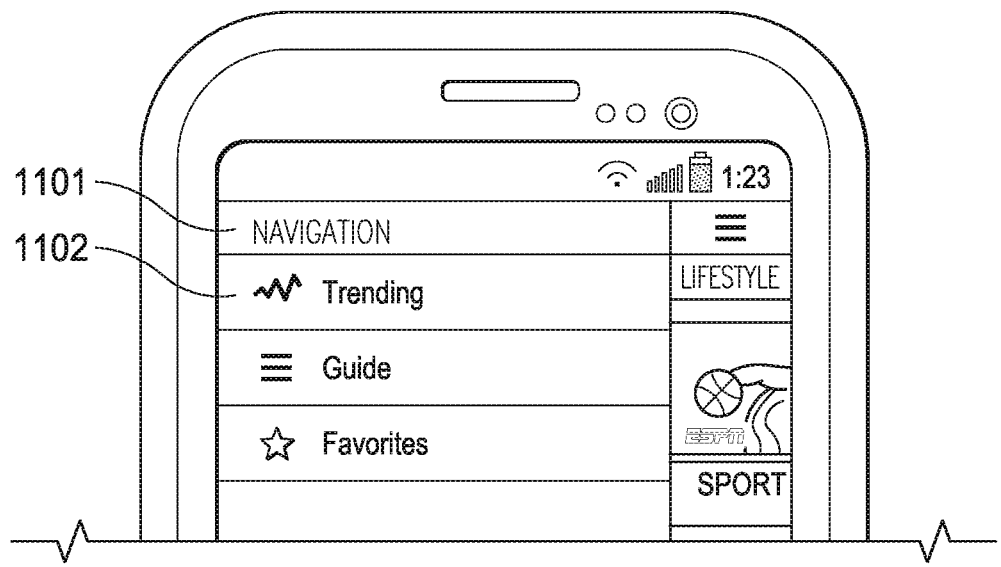
FIGS. 11A-11D illustrate embodiments of mobile device implementations in accordance with the principles of the disclosed systems and methods.
Figure 11B:
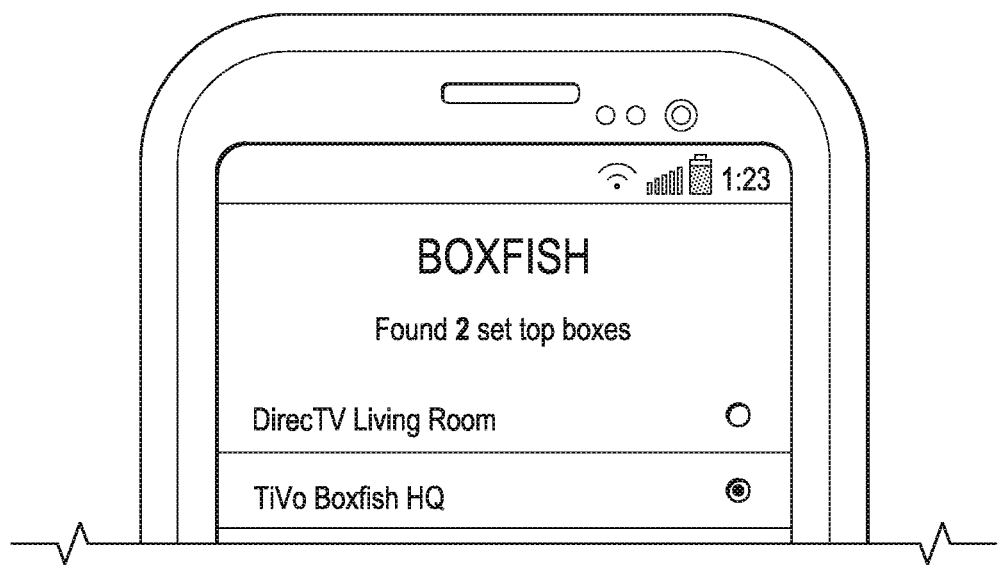
Figure 11C:
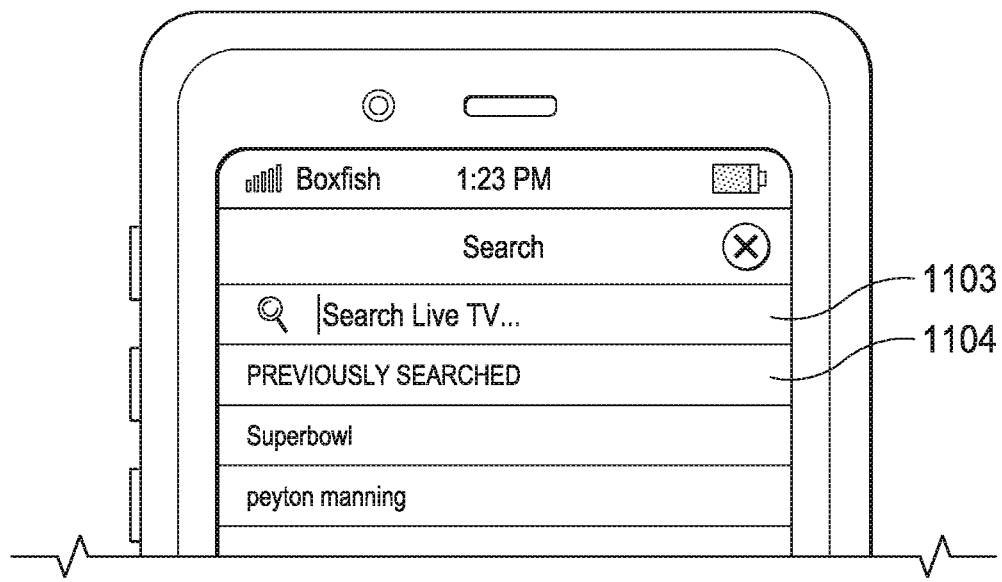
Figure 11D:
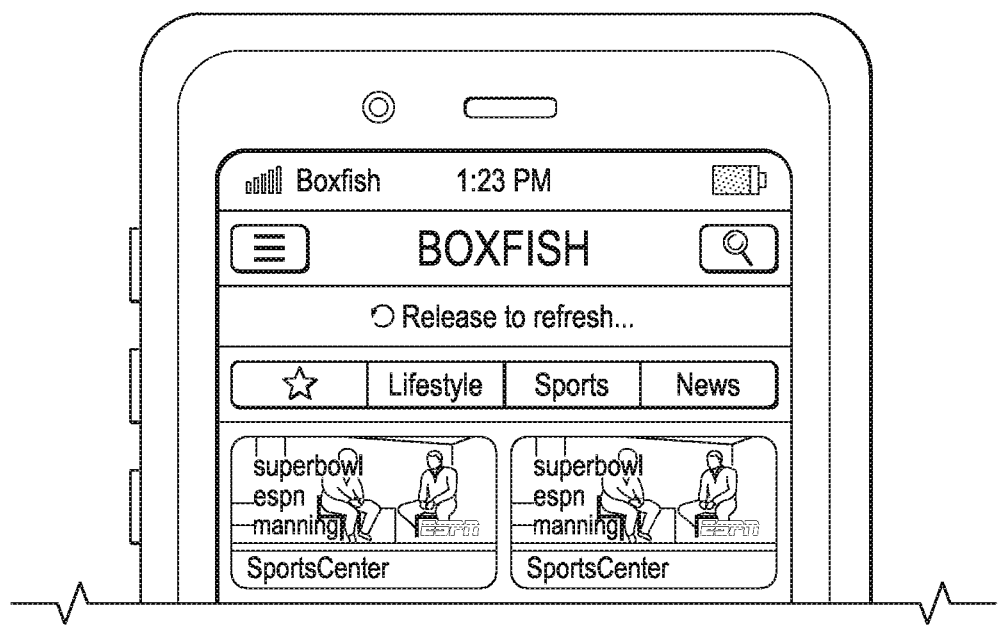

Mobile device implementations, illustrated in exemplary FIGS. 9-10, also provide an engaging client experience. Once again, trending topics are provided on the left, where some of the trending topics are "virginia beach," "the masters," "kim kardashian," "facebook," and "instagram" in this embodiment. Button "more . . . " can be clicked to list more trending topics. A keyword may be entered and searched for in a box provided on top. FIGS. 11A-11D illustrate embodiments of mobile device implementations in accordance with the present disclosure. FIG. 11A shows a Navigation Bar 1101, which further lists Trending 1102, Guide, and Favorites. The Trending 1102 may be selected to list trending keywords or terms. Other embodiments may have more options under Navigation such as Television Guide and Alerts. FIG. 11B illustrates a mobile device locating two set top boxes that it can be connected to. In this embodiment, the two set top boxes are DirecTV Living Room and TiVo Boxfish HQ. There may be more set top boxes in other embodiments. FIG. 11C illustrates a mobile device screen showing a search feature. The search feature will have a search box 1103 where a user can enter search terms. In this embodiment, a list of previously searched terms 1104 is provided under the search box 1103. FIG. 11D illustrates a screen of a mobile device refreshing the client application.

C. Television

Figure 13A:
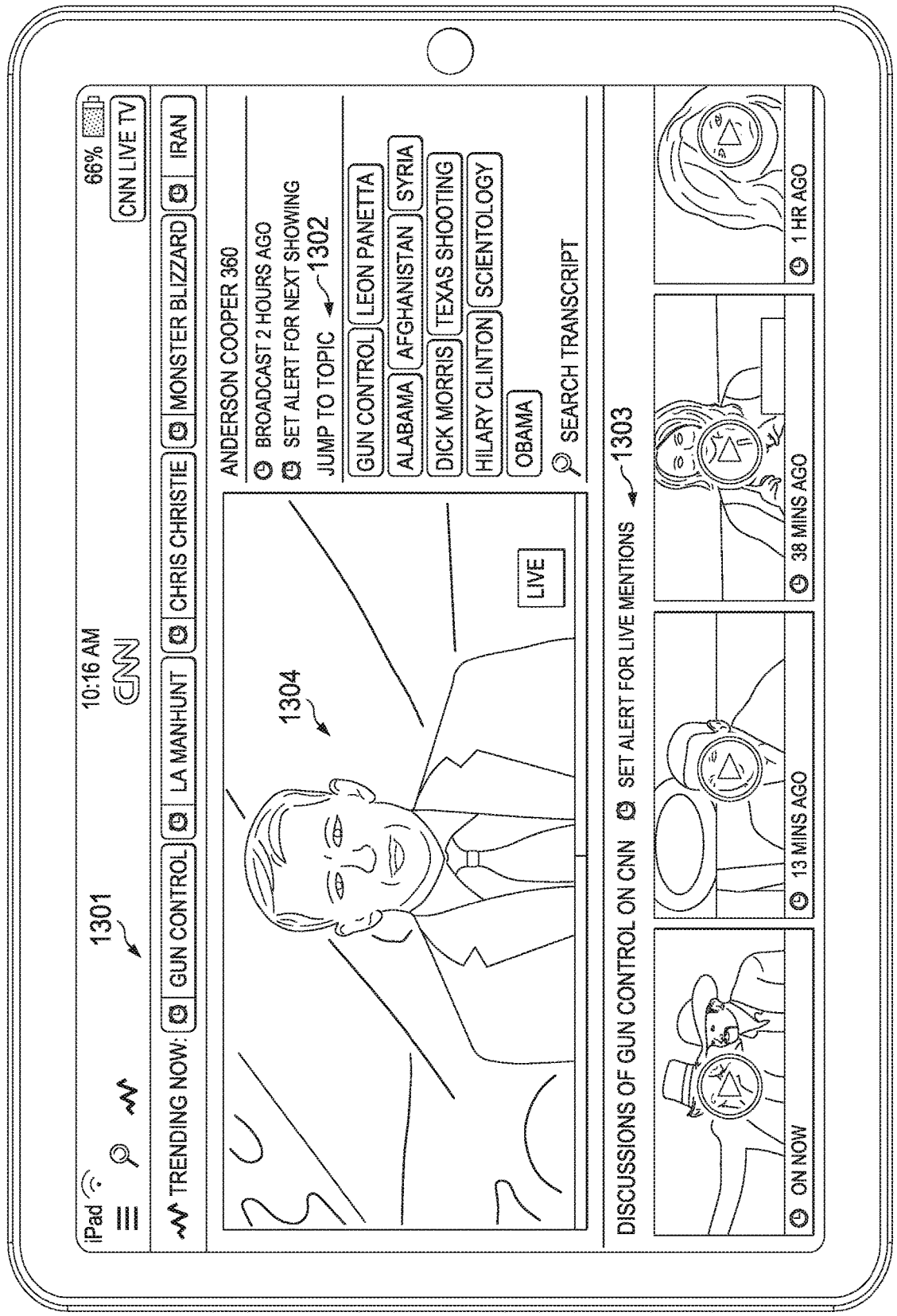
FIGS. 13A-13C illustrate embodiments of a partner application named CNN-expand model.
Figure 13B:
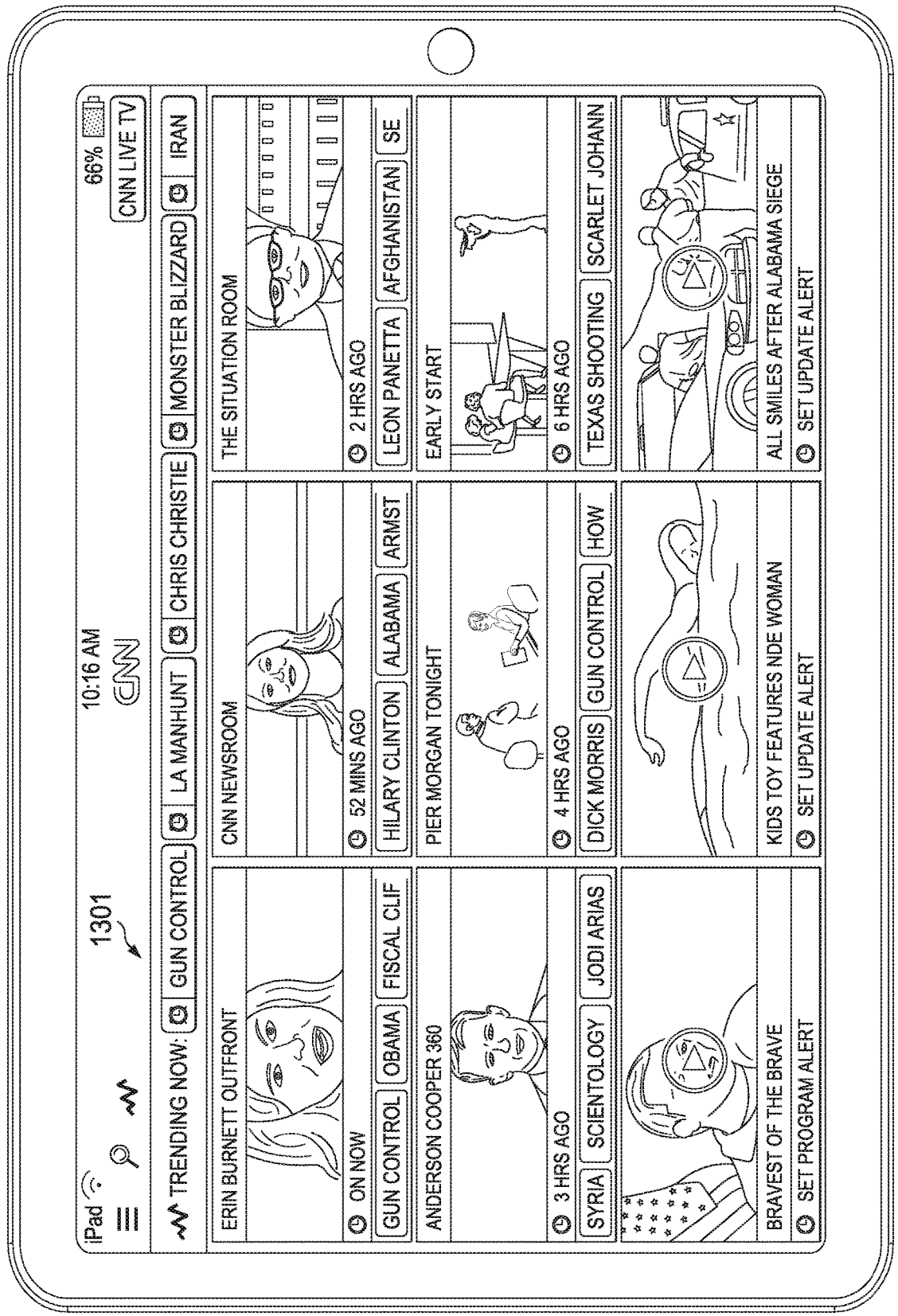
Figure 13C:
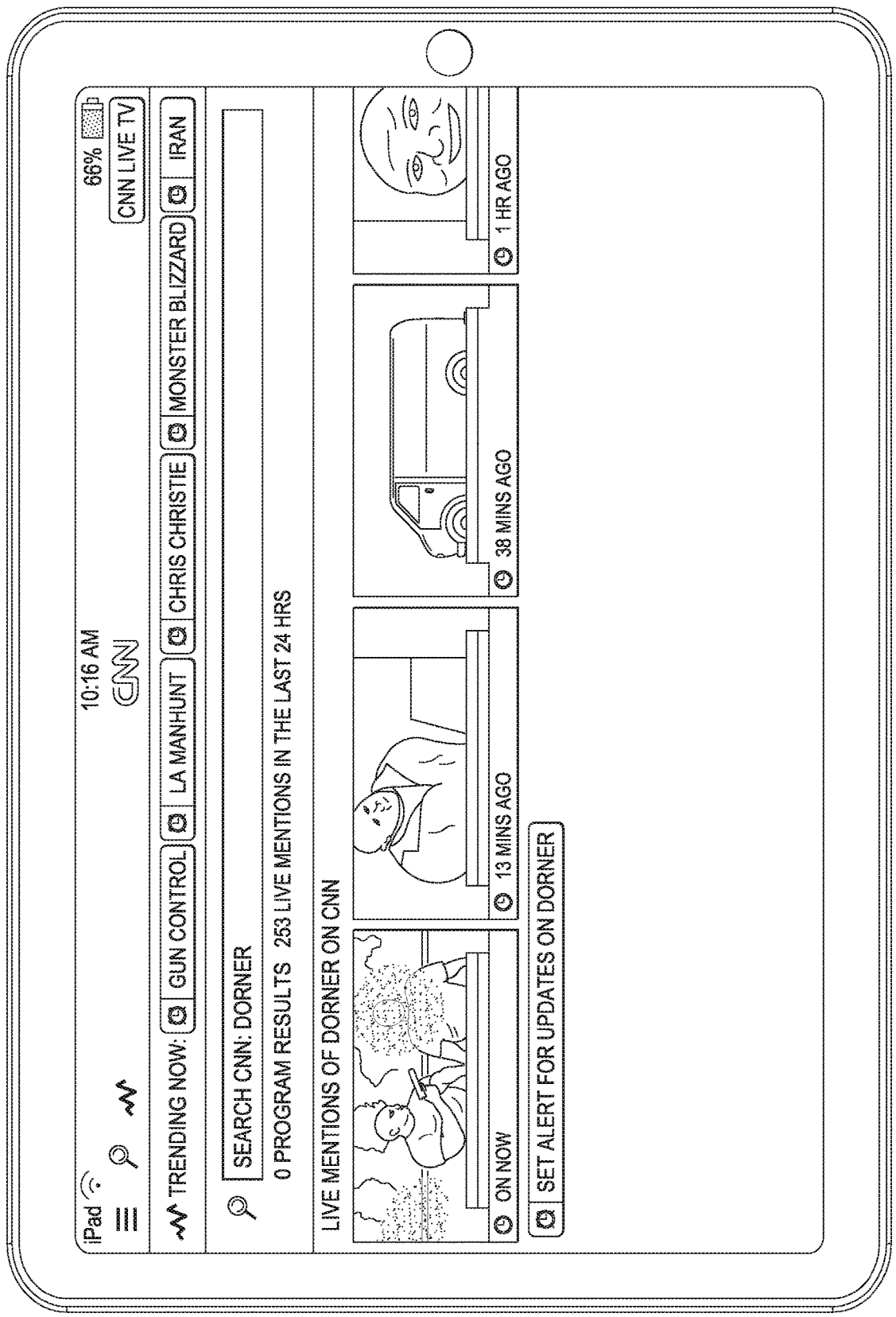

Multiple television manufacturers provide "smart TV" platforms that function using the aforementioned systems. In an exemplary smart TV system, an interface that has similar appearance to the screen presented in FIG. 9 would appear on the smart TV (both TVs with integrated smart TV technology and/or set-top boxes that provide smart TV functionality to TVs lacking such functionality natively) interface/menu. FIG. 12A illustrates an example of a TV home screen in accordance with the presently disclosed systems and methods. Instead of opening on a last channel watched, this embodiment provides a screen with recommendations 1204 when opened. In an embodiment, an on-now screen 1202 displays a show currently selected and playing. The present embodiment also shows Favorites 1205 shows, Coming Up 1203 shows and infomercials, Recommended 1204 shows, and trends 1201. Other embodiments may display other information. The embodiment provides trending TV topics as trends 1201 and context for various shows that can be viewed on TV. FIG. 12B illustrates an autocomplete feature for a TV using the principles disclosed herein. A related, partner application named "CNN-expand model" is similar to the aforementioned example. However, it places an especially large emphasis on topics. This is shown in FIG. 13A. The present embodiment of the CNN-expand model displays trending topics 1301, a currently playing show 1304, Jump to Topic 1302, and related discussions 1303. Pressing on a topic on the Jump to Topic 1302 list allows a user to view shows on that topic. FIG. 13B illustrates another embodiment of the CNN-expand model that allows a user to set program and story update alerts. FIG. 13C illustrates search example of the CNN-expand model. Trending topics are provided on top next to "Trending Now." Keywords may be entered and searched for in a search box under "Trending Now." In this example, "Domer" had been entered by the user. This search has returned 0 program results but 253 live mentions in the last 24 hours. Live mentions of "Domer" on CNN are listed below. Also alerts may be set for updates on "Domer" by clicking on the "SET ALERT FOR UPDATES ON DORNER" button at the bottom.

Figure 14:
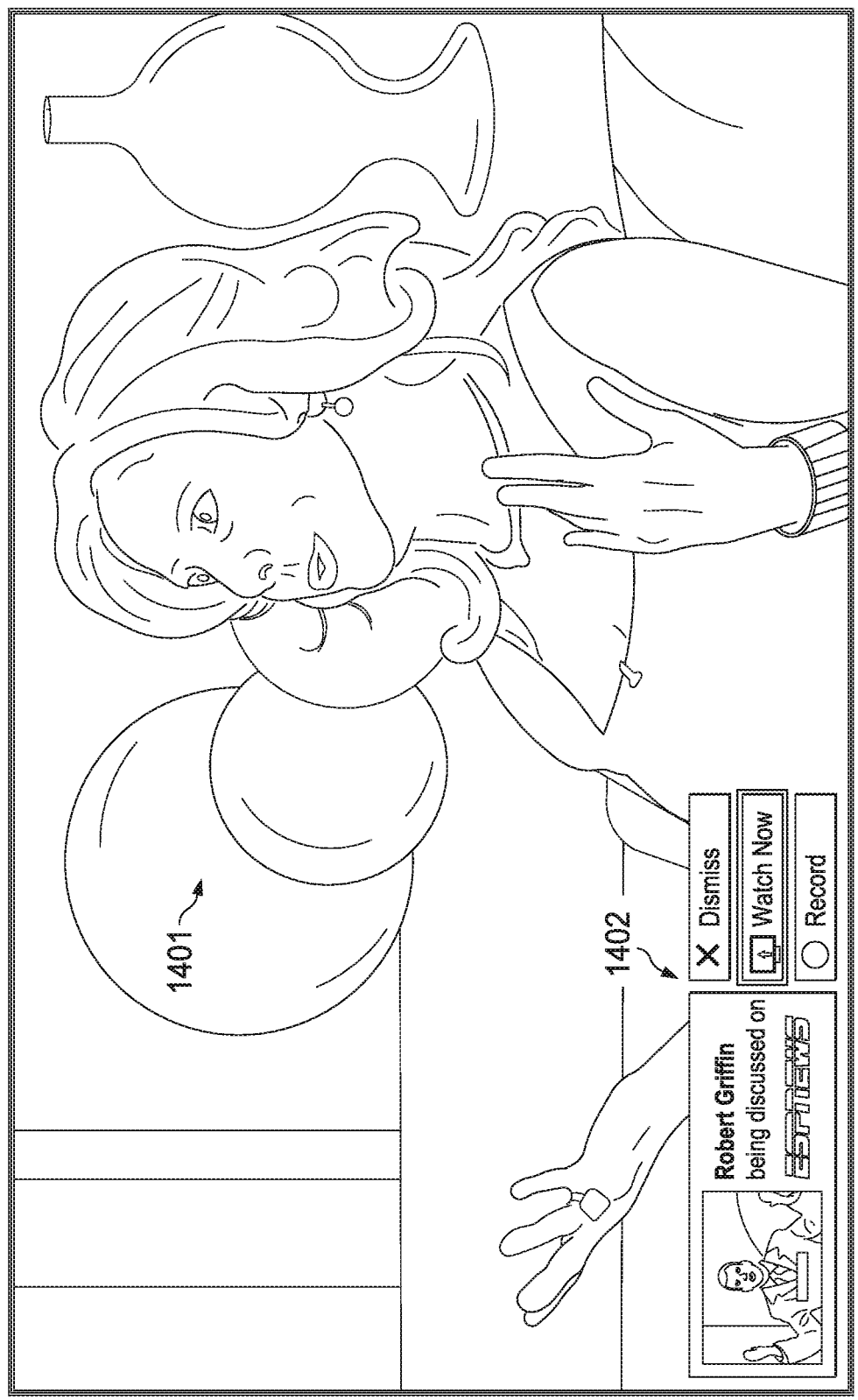
FIG. 14 illustrates an example embodiment of a TV screen displaying an alert in accordance with the principles of the disclosed systems and methods.

FIG. 14 illustrates another embodiment of a TV screen in accordance with the disclosed systems and methods, where TV alerts 1402 are displayed at the bottom while a user is watching a show on a main screen 1401. In an embodiment, TV alerts 1402 are generated based on topics. Thus, while many of the described embodiments herein relate to interaction with a set-top box, such as a cable TV set-top box, the concepts described herein are equally applicable to televisions with built-in guide and tuning functionality, or with network-based or IPTV-based televisions.

Figure 15:
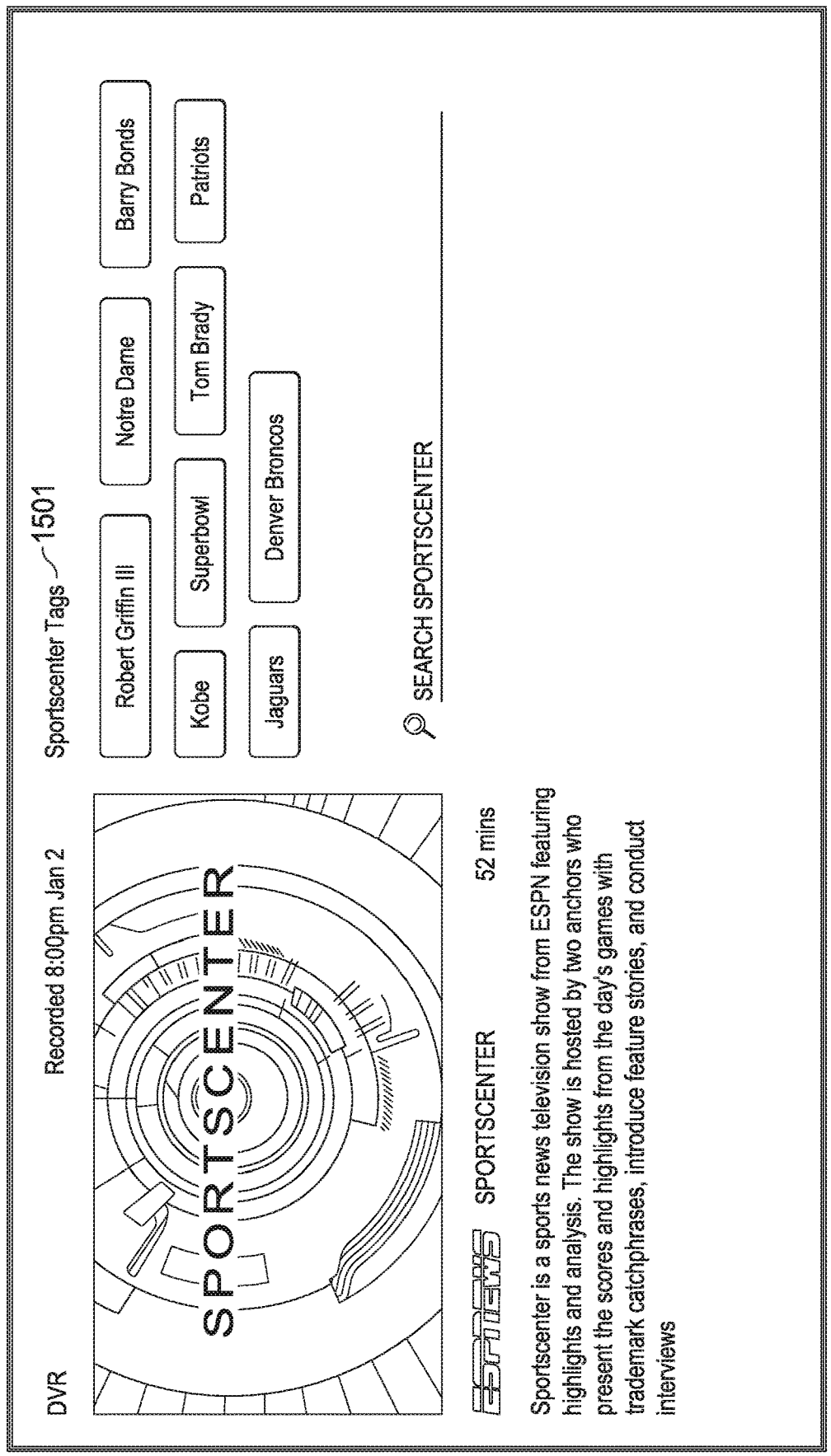
FIG. 15 illustrates an example embodiment of a DVR screen.

FIG. 15 illustrates an example DVR screen in accordance with the principles disclosed herein. In an embodiment, clicking on any of tags 1501 allows a user to view the show at a point where the topic is being mentioned. This embodiment thus addresses a problem with currently known DVR recordings in that it is difficult and time-consuming to find relevant content within the recording. Fast-forwarding through the content is tricky, and only effective if the viewer knows what is being displayed when the programming of interest comes up. The disclosed embodiment provides the ability to effectively locate topics in DVR recordings according to the content of discussion. The tags themselves may be arranged chronologically, in order of perceived importance, or by other metrics. Each tag may effectively be implemented with a time code and topic sent to a DVR through an API discussed in further detail below.

By indexing the content of each recording, the application may allow for a deep search of a recording even without the use of the displayed tags. As show in FIG. 15, the user may type in a custom query to find desired content within the recording. However, it is also possible to search all of the recorded content on the DVR device. In an embodiment, if a keyword is mentioned on a stored program, the application can include that program in the list of items it displays relevant to a user's search query, as well as immediate access to the relevant portion of that program. In general, if a user selects a search result that is stored on a device on the system, a user can start the program at the beginning, or just before the keyword was mentioned.

In an embodiment, the user can also set the DVR to record content based around desired topics. This allows the hard disk space on the DVR to be optimally used for content that the user is interested in. For example, a user may be interest in a particular sports team but it would be impractical to record every sports program just to catch brief mentions of the sports team of interest. Local storage space on the DVR alone would make such a task impractical. However, the real-time nature of the presently disclosed systems and inventions allows for this highly selective system of recordings to take place.

D. As a General Interest Data Source

In addition to the different client formats provided above, the stream of data can be embedded in third party applications or social networks, displaying relevant content to visitors.

IX. Smart Phone Remote App

As a "second screen" device to a TV, these devices can be used to control the TV, acting as a content aware remote control. For example, as a live alert appears on the client displaying a mention for Kim Kardashian, "10 seconds ago," the user can select the mention to have their TV tune into the program containing the mention. These features can be incorporated into embodiments similar to that of the embodiments illustrated in FIGS. 11A-11D.

Further, out-of-home users can initiate a 'record' functionality from their mobile device, initiating a recording on their home DVR.

Because much TV is repeated and/or time-shifted according to location, the platform can predict when relevant programming will appear and alert the client to watch or record a certain channel/program before it has aired or for the relevant portion for the programming.

SMS, email, and/or mobile notification alerts may also provide short, context aware notifications of historic, live, or future showings of relevant content.

In other words, the disclosed systems and methods enable a highly content-aware remote. The app is able to detect when something following user search parameters is mentioned on a specific channel, and notifies the user with a request to change the channel. The remote control app functions can basically include the same input data as the other apps described above. It provides a user with a location of the last sentence on a topic the user is interested in. Thus, in an embodiment, the user can find the channel displaying that last sentence on his or her topic of interest. The user can locate and switch channels based on this information.

Figure 16A:
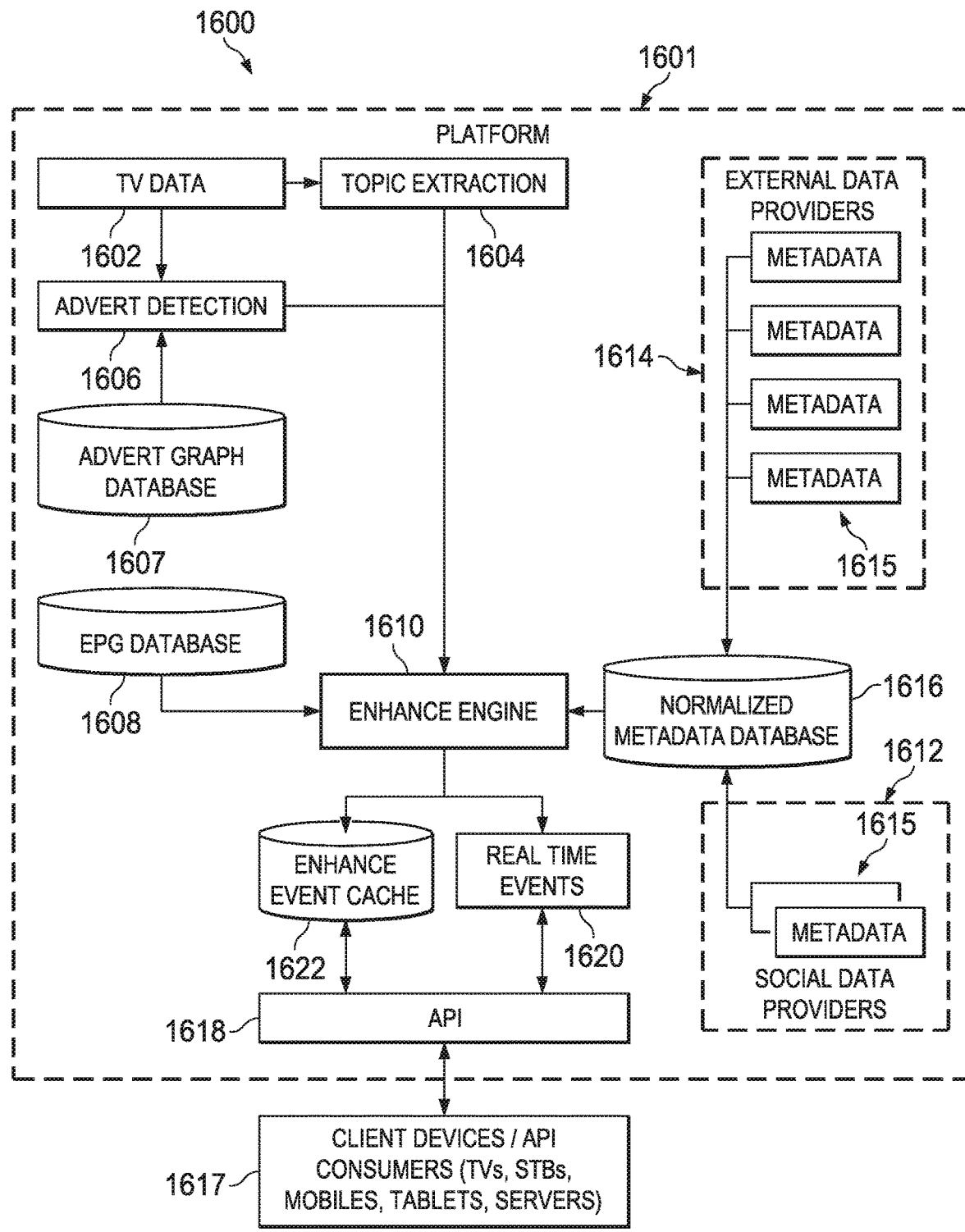

Shown in FIG. 16A is a schematic diagram of the Enhance Ecosystem 1600 for enabling "second screen" functionality on a client device.

The Enhance Ecosystem 1600 includes a Platform 1601 as well as client devices and other API consumers 1617 that may connect to the Platform 1601 through an API 1618. In an embodiment, the Platform 1601 may listen to or otherwise monitor TV data 1602 through any of the methods described above. The Platform 1601 may include a Topic Extraction Module 1604 and Advert Detection Module 1606, which may be implemented using the principles of system 100 and system 300 respectively. In an embodiment, the Advert Detection Module 1606 is enabled through the use of an Advert Graph Database 1607 that stores adverts with count information as well as metadata such as brand information, relationships between adverts, and other information. Both the Advert Detection Module 1606 and the Topic Extraction Module 1604 connect with and provide data to the Enhance Engine 1610.

The platform may also include one or more EPG databases or feeds 1608 that provide program scheduling information to the Enhance Engine 1610. In an embodiment, the EPG database(s) 1608 may provide information substantially in real time. Metadata 1615 may be received from Social Data Providers 1612, such as Twitter, Facebook, and Foursquare and stored in a Normalized Metadata Database 1616. The metadata 1615 may relate to individual end users or detected topics associated with the television content, though other types of metadata may also be received. The metadata 1615 may include substantially real time content feeds, news articles, and advertisements. For example, in an embodiment, Twitter data associated with various brands may be used to time the display of a relevant "tweet" on a user's "second screen" client device 1617 with an overlapping topic on the same user's television, which may also be a client device 1617. The Normalized Metadata Database 1616 may also receive data from other External Data Providers 1614. Metadata 1615 from each source may be harnessed through the use of API's provided by the Data Providers 1612, 1614. In an embodiment, the Normalized Metadata Database 1616 may include hardware and software operable to pull data from some sources 1612, 1614. In an embodiment, some sources 1612, 1614 may push data to the Normalized Metadata Database 1616. The Normalized Metadata Database 1616 may normalize received metadata 1615, such that metadata related to common topics may be merged or stored with common identification. The Enhancement Engine 1610 receives information from the Normalized Metadata Database 1616 which it may then use to complement TV subject matter indicated by the Topic Extraction Module 1604 and/or Advert Detection Module 1606.

The Platform 1601 may provide an API 1618 for connecting with client devices and API consumers 1617. Client devices 1617 may include TVs, set-top boxes, mobile devices (including tablets), and servers, as well as other machines operable to interface with the API 1618. Some client devices 1617, such set-top boxes, may act as the primary screen devices for displaying TV content, and some client devices 1617 may act as "second screen" devices to complement and enhance TV content.

Figure 16B:
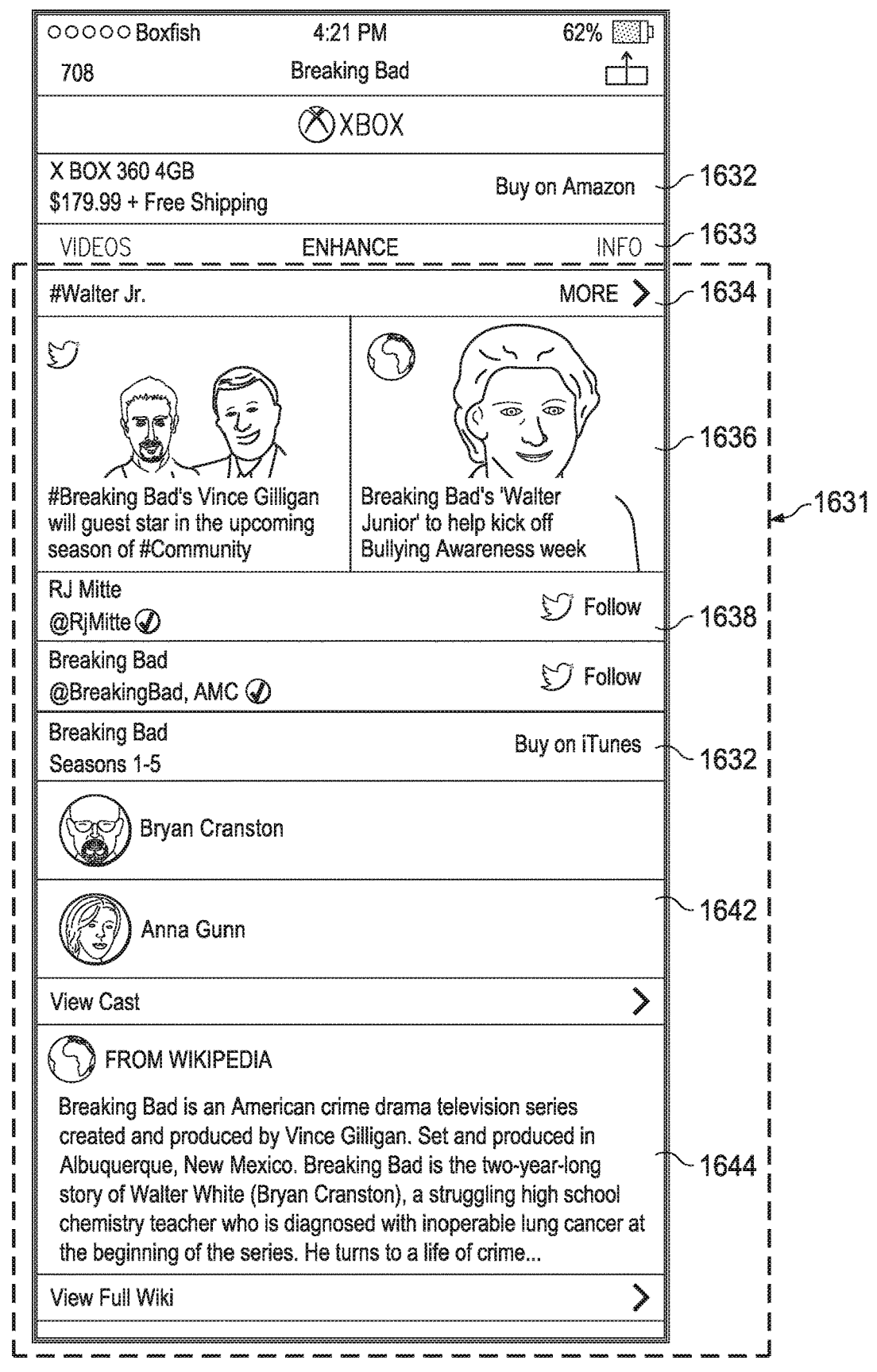

Through the API 1618, client devices 1617 may be connected to the Enhance Engine 1610. More specifically, the API 1618 may provide access to Real Time Events Data 1620 and Enhance Event Cache 1622. The Real Time Events Data 1620 may include trends and other data that are substantially occurring in real time. In an embodiment, after (or as) an event occurs, real time data associated with the event may be accessible via the Real Time Events Data 1620 for a short period of time. After this period of time, the data may then be moved to Enhance Event Cache 1622, allowing it to still be accessed through the API 1618. FIG. 16B illustrates an exemplary user interface that may be displayed on "second screen" client devices, in an embodiment in accordance with the presently disclosed systems and methods. A user may be watching a TV show (as opposed to news, sports content, or other types of television content) on a "primary screen" device when this content is displayed on the "second screen" device. In this embodiment, the "second screen" content may include advertisements 1632 that may or may not be related to the content on the "primary screen" device. The advertisements 1632 may be chosen as a result of a successful bid in the advert exchange marketplace, simply related to the "primary screen" content, or chosen by other metrics. The advertisements 1632 may be displayed in less prominent positions on the "second screen" device or may not be displayed at all. The "second screen device" may also display a menu 1633 that may be horizontally scrollable. As shown in FIG. 16B, the Enhance sub-window 1631 is selected and visible. Detected topics or entities may be displayed within a topic box 1634. In the context of a TV show, the topic may include an aspect of the universe within the TV show, such as a character. Selecting the topic box 1634 may lead to additional content associated with the topic. The Enhance sub-window 1631 may also include thumbnails 1636 linking to articles, video content, or other content associated with the detected topic. The thumbnails 1636 may also be unrelated to the detected topic, and simply related to the TV show as a whole. The content linked by thumbnails 1636 may be provided by the External Data Providers. The Enhance sub-window 1631 may also include Twitter boxes 1638 that may be associated with the detected topic or the TV show as a whole. For TV content with recurring characters, certain characters/actors may appear in character boxes 1642. The user may expand on individual characters or select to see content associated with different characters. In this embodiment, the "second screen" device may also present Wikipedia information on the TV show or topics detected within the TV show. The information may be read from directly within Enhance sub-window 1631, or the user may select from external links.

Figure 16C:
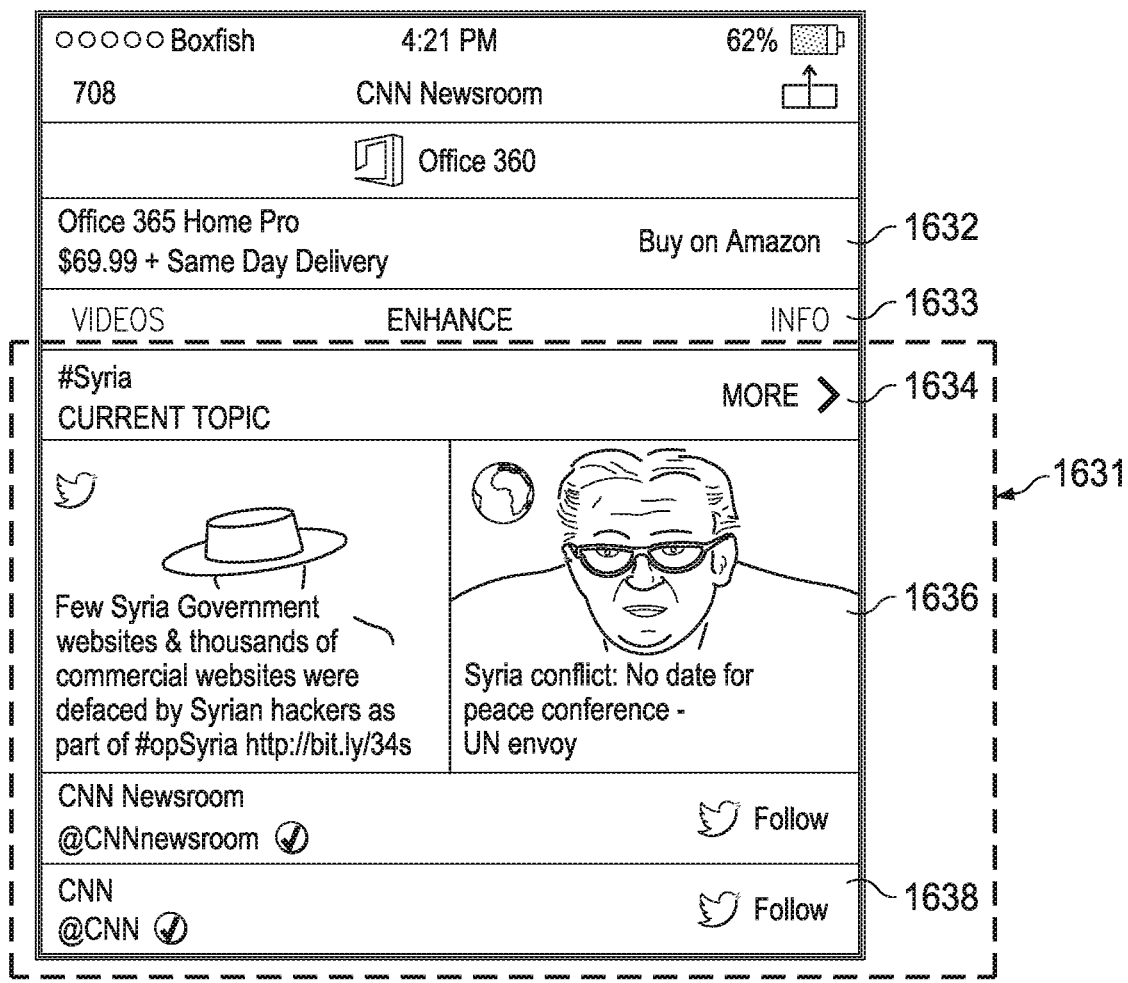

Though FIG. 16B shows a very long screen of content, only a portion of this content may be rendered on the "second screen" device and visible to the user at a given time. The content on the "second screen" device may be vertically scrollable by the user. FIG. 16C demonstrates another Enhance sub-window 1631 that may be presented on "second screen" devices when the associated "primary screen" device shows a news program. This "second screen" content may be presented within the same embodiment as that of FIG. 16B, and demonstrates that the Enhance sub-window 1631 may adapt to different types of TV content. In this Enhance sub-window 1631, the topic may be related to the present topic of discussion on the news program. The Enhance sub-window 1631 may update periodically or substantially in real-time. The presentation of the topic window 1634, thumbnails 1636 and Twitter boxes 1638 may be similar to those in a TV show's Enhance sub-window 1631. However, the topics and the metrics for selecting topics during news programs may be different. Other types of "primary screen" device content, such as sports or movies, may have similar or different Enhance sub-windows 1631.

X. Real-Time TV Monitoring, Tracking and Control System

Various aspects of the remote control/user interface are further described in U.S. Provisional Patent Application No. 61/749,889, filed on Jan. 7, 2013 and entitled "Real-Time Television Monitoring, Tracking and Control System," which, including the Appendix thereto, is hereby incorporated by reference herein for such description, including how such functional elements are incorporated in the described system. Further placing the user interface elements in the context of the overall discussion of the system above, these elements are generally described below with respect to their accompanying figures.

A. Tiled Channel View

Figure 17:
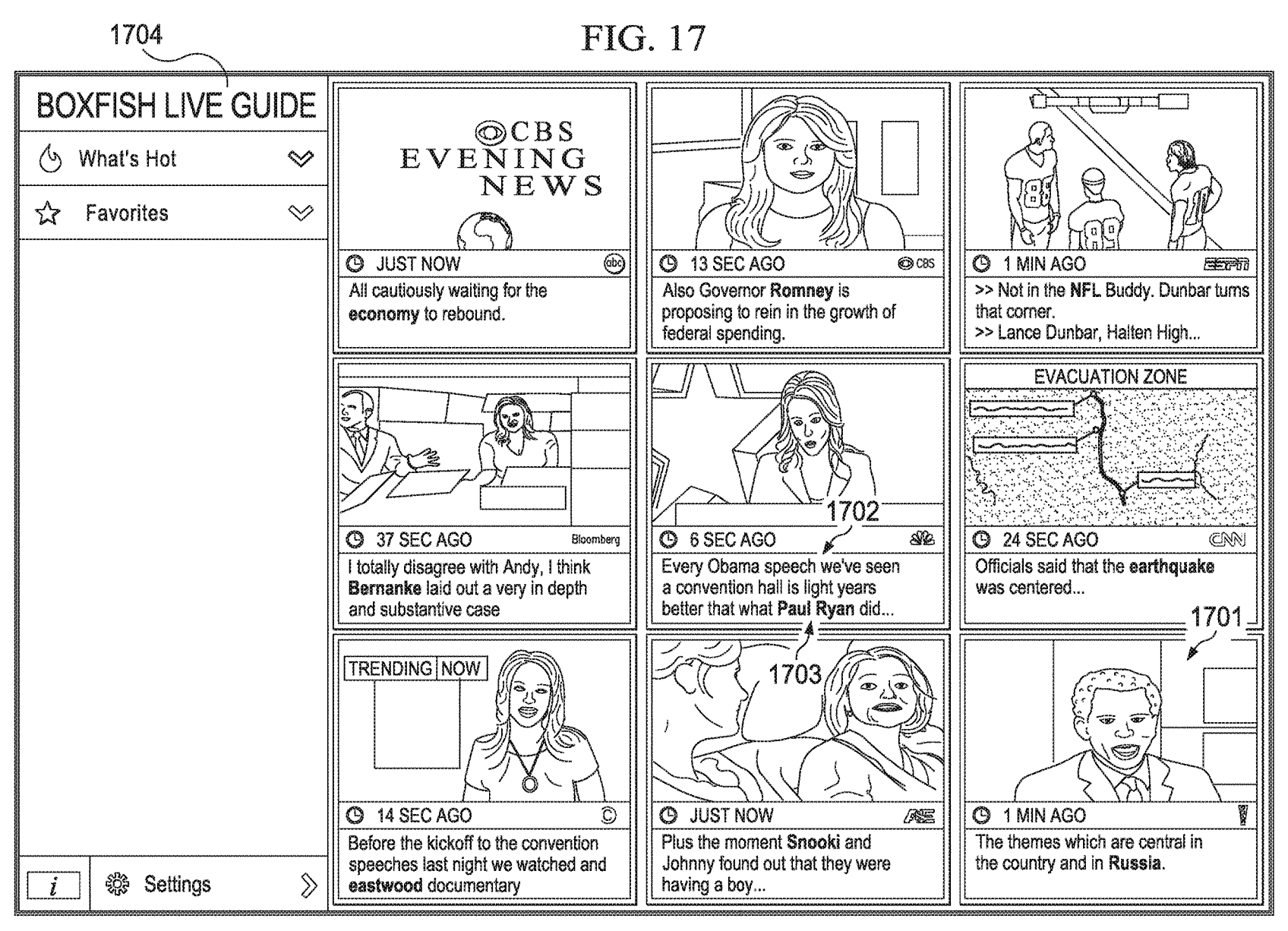

Shown in FIG. 17 is a tiled view in which the user, according to the channel preferences, could see nine different image thumbnails 1701 and text 1702 associated with each of these thumbnails 1701. The text 1702 is updated periodically in real time and can be designed to scroll beneath each of the thumbnails. Certain entities or topics are identified in 1703. To the left of these nine tiles 1701 is a user application 1704 that gives the user the ability to find his or her favorite channels that will be presented here and provides various preset settings such as sports, what's hot, news channels, entertainment and such. Each of these settings is a preconfigured option that provides a distinctive advantage over previously known embodiments in set-top boxes where only certain defined channels were presented with information and without associated text. In these prior applications, no ability to use text searching was provided to search what's hot or according to defined user keywords.

Each image tile 1701 is updated periodically with interesting sentences using a mechanism that displays or abandons sentences according to whether or not they contain meaningful entities. Each tile 1701 updates either every ten seconds or whenever a keyword is spoken on TV. This functionality happens in a sub process of a topic extraction. The main point being that the system can provide, in a user efficient fashion, user relevant text that goes with these various image tiles 1701. The Image Server 409 provides images and the Index of TV 415 provides the text that goes below each tile 1701. The EPG Nielsen data 411 is fed in along with local programming channel data in order to provide contextual information about the channels provided. This information includes, for users whose set-top box is not directly compatible with the application, a display of what channel to tune to.

B. Tile Option View

Figure 18:
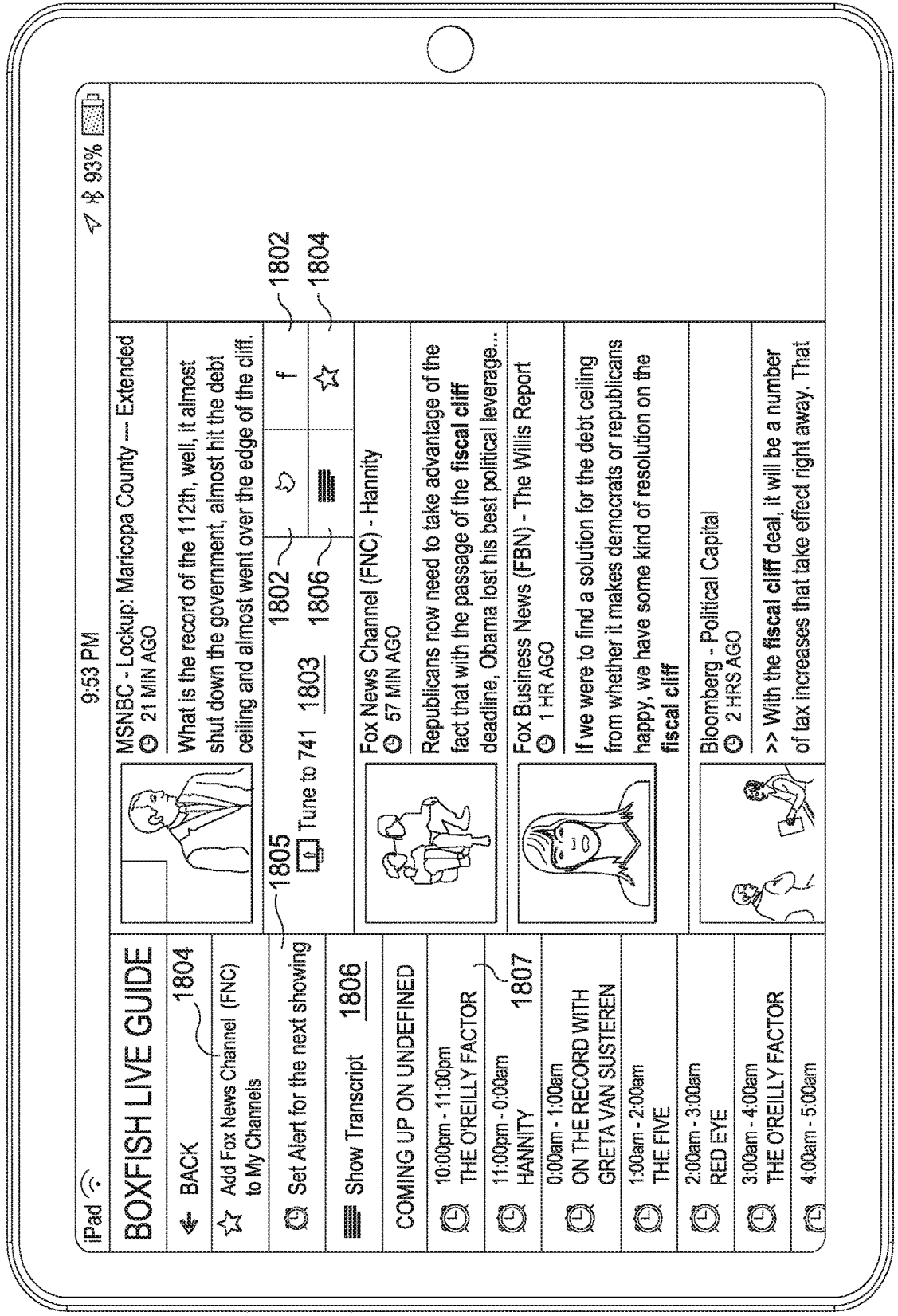
FIG. 18 illustrates another example of the user interface that has been expanded to display channel options.

Each tile 1701 has additional option available to a user, such that if a user taps on a tile 1701, the tile flips over to display these additional options illustrated in FIG. 18. These additional options include:

1. To Connect to a Social Media Website 1802

This button allows a user to post a clip of the transcript to a social media website such as Facebook or twitter.

2. To Tune to a Channel 1803

This button allows a user to interact with their set top box and tune to the tile 1701's channel. If interaction between the application and the set top box is not possible, this button is replaced with a note detailing what channel the user should tune to if they wish to watch the current program.

3. To Add the Channel to the My Channels 1804,

This button allows a user to add the tile 1701's channel to his or her favorites list, which is displayed when the user accesses their custom channels.

4. To Set Alerts 1805

This button allows a user to set an email alert to notify them when the tile 1701's displayed program is playing again, or when to alert them to the next mention of a specific topic keyword. In another embodiment, the button may be referred to as an alarm.

5. To display a Transcript 1806

This button allows a user to display the transcript of the Tile 1701's channel.

An embodiment of FIG. 18 also displays a play bar (not shown), which displays how much of the program is left. Furthermore, "Coming Up on Undefined" 1807 is provided at the bottom left-hand corner that lists upcoming shows and their play times. For example, "The O'Reilly Factor" is provided with its play time 10:00 pm-11:00 pm.

Other similar applications allow for automatic tuning to a channel when a specific television program is playing, but the user doesn't necessarily know if the topic of that episode has anything to do with any of their interests. For example, CNN will always have news at eight, however the stories being displayed on CNN may not necessarily be relevant to a specific user's interests all of the time. Such that if the user is interested in politics but not in sports, that user would only tune to CNN in regards to politics. Other applications display that CNN is currently showing news, but not what that news is about. So if a user interested in politics has to manually tune to that channel they have no way of knowing if CNN is currently running a story on politics or sports.

The application has the capability to connect to a user's Wi-Fi network in order to control the user's set top box. However, it is also able to search TV storage components such as DVR and TiVo for key and trending words, and gives the user the option to begin playing stored TV programs from the point where these keywords are mentioned. So if a user does a search for Giants and their TV storage component has ESPN's Sportscenter recorded, the application will display that the user has this program recorded and give the user the option to begin playing the program just before the point where that trending keyword was mentioned. The index of TV stores metadata about the spoken words and the time period within a program that the word was spoken. Other metadata includes channel description, title, cast, program, locations, specific people, and other information that allows the application to make reasonable guesses about a user's tastes based on their interaction with a given television program.

C. Tiles Favorite View

Figure 19:
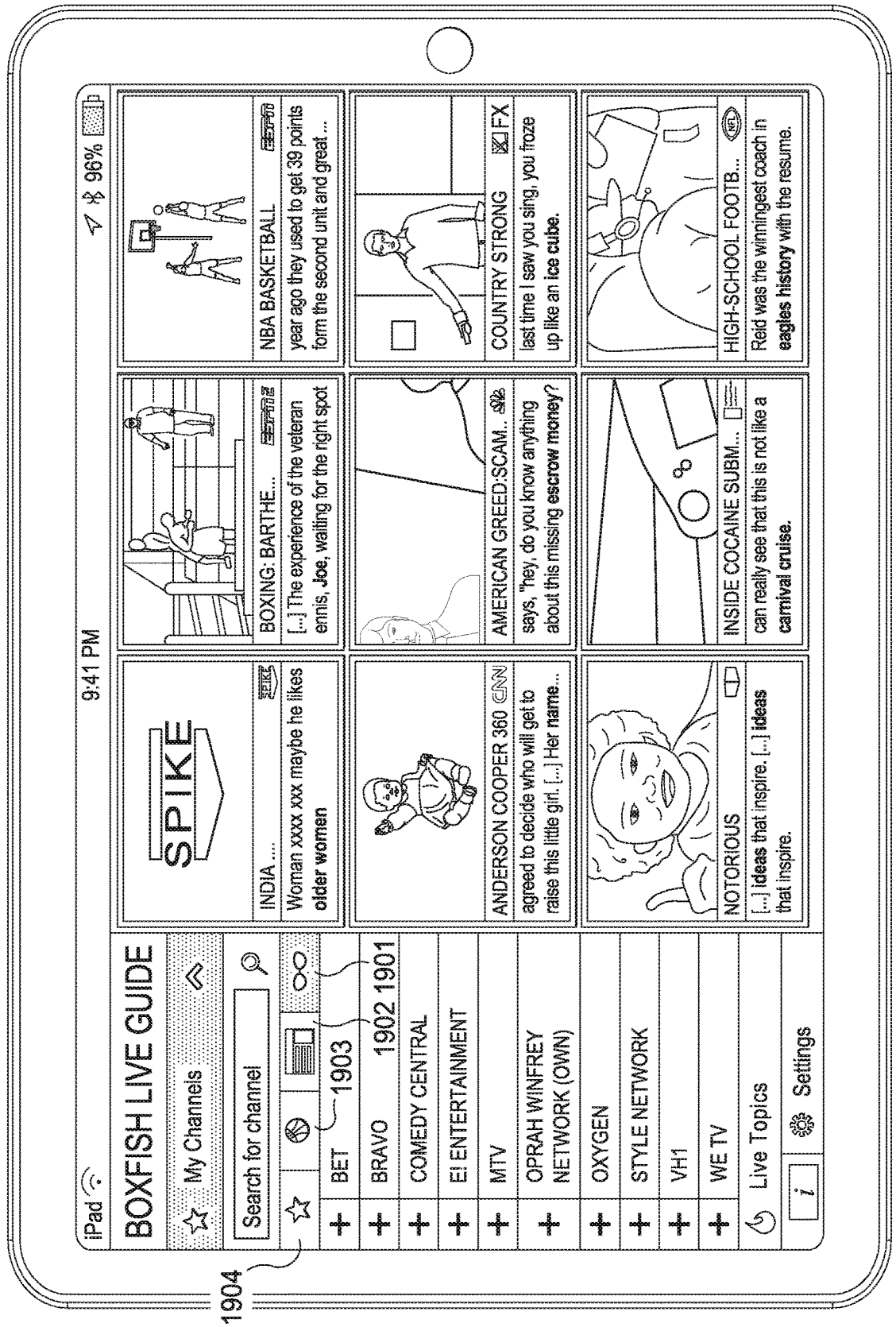
FIG. 19 illustrates another example of the user interface such that "My Channels" option has been expanded to display its capabilities in regards to customizing entertainment channels.

FIG. 19 shows the My Channels 1804 panel expanded to display the user's available options. Celebrity channels 1901 displays trends relating to celebrity gossip, news channels 1902 displays current trending news stories, sports channels 1903 displays current trending sports channels, and My Favorites 1904 displays channels the user has hand-picked using the select channel button for My Channels 1804.

D. Search View

Figure 20:
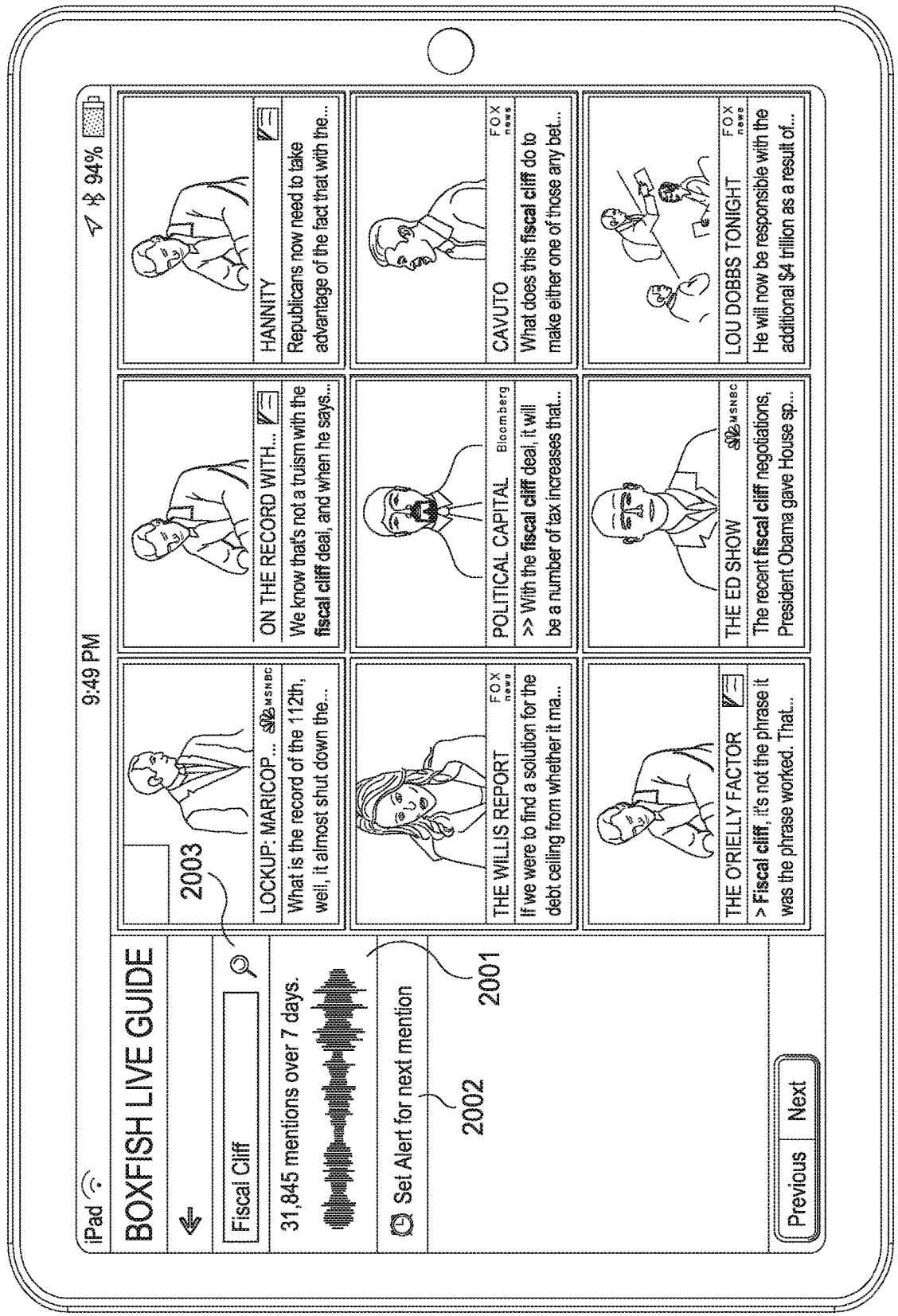
FIG. 20 illustrates another example of the user interface that displays the application's search features and keyword options.

FIG. 20 displays the results within the user interface that are produced as a result of the user searching for a specific keyword. When a keyword is typed into the search bar 2003, the application does a historic search for all references of the searched keyword and displays the most current and relevant instances of that word in the standard nine tile 1701 view on the right-side of the screen. This screen also provides the user with a histogram 2001 of how frequently the searched keyword has been mentioned. The user is also given the option to set an alert for the next mention 2002 of the specific keyword.

XI. Trending TV Components

A. Trending—Trending TV by Genre Based on Words Spoken ON Television (Not on Social Networks About TV)

Trending Television is displayed in a nine-tile 1701 pattern across the user interface. These tiles 1701 continually update according to what is happening on the show currently displaying, or should that show deviate from a trending topic, have the capability to update according to other trending keywords.

These trending keywords are based on trending algorithms that decide what is unusual, breaking, unique, or currently interesting. The application tends to show sports and news as these things tend to be talked about in clusters then never mentioned again, but users have the capability to modify their settings based on their interests. Each tile 1701 can be tapped to open additional information displayed, including live feed and a transcript of the program. Tapping on a tile 1701 also opens an option menu on FIG. 18, which allows the user to set alerts to show the next mention of the phrase that caused the topic to be considered trending, to set alerts to show the next showing of that program, or to add that channel to the user's favorites. A user can also choose subcategories of trending TV which allows them to view specific subjects such as sports or news.

B. Favorites (My Channels)—View spoken Words on Your Favorite Channels in Real-Time This functionality is similar to that of a TV guide which displays in a grid view of television and updates in real time. It is different from traditional TV guides because instead of displaying spreadsheet data, such as start and end times, it displays a grid of the user's favorite channels and updates them according to what is happening in real time on those channels. A user can choose the channels that they normally watch and add them to the My Channels feature. They can also view categories such as sports, news, and celebrity channels, in addition to their hand-picked channels. My Channels data is inputted according to a user's preferences and allows the user to keep a customizable list of channels bookmarked. These bookmarked channels also provide a user database with context from which to determine a user's interests and further customize its provided information. The user can also create a customized set of keywords that the application will search for in real time.

C. Search—Search Words Spoken on TV

This option gives the user a historic results list of the mentions of the searched word on TV. The application also displays a series of metrics that revolve around the searched word, such as frequency of mentions on TV. The searching option allows a user to search current trends using metrics according to keywords.

D. Tile 1701 Functionality

Each tile 1701 that appears in the app has an extended list of features that are accessed by tapping on that tile 1701. These features include options for sharing the channel or components of the transcript on a social media website, adding that channel to the user's favorites, setting an alert for the next mention of the word of phrase that caused that channel to be part of the trending display, or setting an alert for the next time the program that the tile 1701 currently displays comes on.

E. Change Channel—Ability to Tune to a Program Based on a Trending Word

The application has the ability to change channels according to what trending keywords are either being searched or viewed. When a user taps on a channel tile 1701, the tile 1701 flips over and immediately begins playing the selected channel. If the app is connected to an IPTV capable system, the app can remotely change the channel on a TV to show the channel selected.

F. Alerts—Alerted When a Keyword is Mentioned on Television

The application has the ability to send an email alert to a user when a previously selected keyword is mentioned. Mechanisms may be used to keep the user from being bombarded with emails if a keyword suddenly becomes popular.

G. Commerce—Buy Goods Based on Words Spoken on TV (Adwords for TV)

When a keyword is spoken relevant to a specific item (for example a Gucci Handbag) the application is capable of providing the user a link to the Gucci website.

XII. Glossary of Terms

API (Application Programming Interface): An API is a source code-based specification intended to be used as an interface by software components to communicate with each other. An API may include specifications for routines, data structures, object classes, and variables.

CDN (Content Distribution Network): A CDN is a system of computers containing copies of data placed at various nodes of a network. When properly designed and implemented, a CDN can improve access to the data it caches by increasing access bandwidth and redundancy, and reducing access latency.

Redundancy: Redundancy within a computer network means that multiple versions of a single piece of data exist in multiple places across a network. This is useful because it means that a program searching for this information is more likely to find it, needs less bandwidth to continue its search, and, in the case of damage to a physical server, the data isn't truly gone because other copies of that data exist elsewhere.

Client: Client, at least in the context of this document, is meant to indicate a program that interacts with the main Real-time Delivery of Segmented Video, but is not a part of it. A client can be can be anything from a mobile device app to a web-based user interface. For the most part, clients are used by users to access the database and retrieve data.

Client Devices: A Client Device is any device that runs a client program, such as an Apple IPhone, an Android capable phone, or a TV with IPTV capabilities.

Cloud: Cloud infrastructure or simply "the cloud" is a system of data organization in which pieces of data are scattered across a network of physical servers. These servers can be pretty much anywhere in regards to their physical location, but are all linked by a common cloud network. Cloud infrastructure has many benefits, including a massive capability for redundancy, a capability to store and efficiently use local and regional data, and a network that will lose little data in the case that a physical server is damaged.

DVB (Digital Video Broadcasting): DVB is a suite of internationally accepted open standards for digital television. DVB standards are maintained by the DVB Project, an international industry consortium with more than 270 members, and they are published by a Joint Technical Committee (JTC) of European Telecommunications Standards Institute (ETSI), European Committee for Electrotechnical Standardization (CENELEC) and European Broadcasting Union (EBU).

EPG (Electronic Programing Guide): EPG provides users of television, radio, and other media applications with continuously updated menus displaying broadcast programming or scheduling information for current and upcoming programming.

Function: Function, at least in regards to the context of this document, is used to describe any task that a program or a component of a program is designed to do. For example, "The Capture Platform 110 provides a number of functions" simply means that the Capture Platform 110 has the capability of performing a number of tasks.

IPTV (Internet Protocol Television): IPTV is a system in which television services are delivered using the Internet or a similar wide-scale network, instead of using traditional terrestrial, satellite signal, and cable television formats.

JSON (JavaScript Object Notation): JSON is a light-weight text-based open standard designed for human-readable data interchange.

Line 21: Line 21 (or EIA-608) is the standard for closed captioning in the United States and Canada. It also defines Extended Data Service, a means for including information, such as program name, in a television transmission.

Long-Form Video: Long-Form video at least within the context of this document, simply refers to video data before it has been processed. The actual length of the video may vary, but in most cases it can be assumed to be about the length of a television show or movie.

Media RSS: RSS, originally called RDF site summary, is a family of web feed formats used to publish frequently updated works. Media RSS simply refers to an RSS feed that is used for media.

OCR: Optical character recognition, or OCR, is the mechanical or electronic translation of scanned images of handwritten, typewritten or printed text into machine-encoded text. This conversion is used by the System 100 to translate close captioned text into a form that the Entity Extractor 102 is capable of reading.

RAID (Redundant Array of Independent Disks): RAID is a storage technology that combines multiple Physical storage servers so that they function as a single unit. This single unit, known as a Logical unit, doesn't require that the servers be physically close, only that they are linked by a network. Data is distributed across the drives in one of several ways called "RAID levels," depending on what level of redundancy and performance (via parallel communication) is required.

Relational Database Management System (RDBMS): RDBMS is a Database Management System in which data is stored in tables and the relationships between the data are also stored in tables. The data can be accessed or reassembled in many different ways without requiring that the tables be changed.

Representational State Transfer (REST): REST is a form of software architecture for distributed hypermedia systems such as the World Wide Web. REST style architectures consist of clients and servers. Clients send requests to servers; servers process requests and return appropriate responses.

Social Graph: A social graph is a collection of data points that represent a person's interests and how those interests interact. Social graphs can be expanded to include information about a group of people or about a group of interests shared by multiple people.

Topic: A topic, according to this system, is a basic description of a chunk of video. The topic can be broad, such as "Sports" or "News" or specific, such as "Lady Gaga" or "Bill Gates." A chunk of video can have as many topics as is required to describe it. These topics are what the system looks for when it attempts to find relevant videos to a search query.

User: A user is anyone using or a client of any of the systems described herein, such as the System 100.

XIII. Summary

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

In all descriptions of "servers" or other computing devices herein, whether or not the illustrations of those servers or other computing devices similarly show a server-like illustration in the figures, it should be understood that any such described servers or computing devices will similarly perform their described functions in accordance with computer-readable instructions stored on a computer-readable media that are connected thereto.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method comprising:
   receiving, by a computing device, a user request to query for a desired topic;
   determining a trending topic, associated with video content, that is related to the desired topic by:

determining a first plurality of words associated with the video content by receiving data corresponding to one or more words spoken in the video content;

querying a database that stores a second plurality of words associated with topics trending on one or more websites; and determining the trending topic based on a frequency corresponding, to the first plurality of words and the second plurality of words and based on a spread, across different content channels, of the first plurality of words and the second plurality of words;

generating, based on the user request, search keywords comprising:
  a first keyword corresponding to the desired topic, and
  a second keyword corresponding to the determined trending topic; and sending, to a user device, search results based on the search keywords.

2. The method of claim 1, wherein the receiving the data corresponding to the one or more words spoken in the video content comprises:
  receiving a plurality of streams, wherein each stream of the plurality of streams comprises additional video content different from the video content; and
  for each stream of the plurality of streams:
    receiving, based on a transcript of the additional video content of the stream, an additional plurality of words in the additional video content of the stream.

3. The method of claim 1, wherein the determining the trending topic comprises:
  determining, based on how often each of the first plurality of words and the second plurality of words is mentioned across a plurality of streams, a popularity score for each of the first plurality of words and the second plurality of words.

4. The method of claim 1, wherein the receiving the data corresponding to the one or more words spoken in the video content comprises:
  receiving transcripts of additional video content.

5. The method of claim 1, further comprising:
  outputting, in a user interface, a portion of the one or more websites.

6. The method of claim 1, wherein determining the trending topic further comprises:
  determining a first word of the first plurality of words and a second word of the second plurality of words correspond to the sane entity.

7. The method of claim 1, wherein the database is configured to store a plurality of topics that are trending on a social media website.

8. The method of claim 1, wherein determining the trending topic further comprises:
  determining the trending topic within a geographical region.

9. The method of claim 1, wherein determining the trending topic further comprises:
  determining the trending topic within a topic group.

10. The method of claim 1, wherein the search results comprise a link to the trending topic, and the method further comprises causing, based on a selection of the link to the trending topic, output of one or more trending keywords.

11. The method of claim 1, further comprising:
  filtering, based on preferences associated with the user device, the search results.

12. The method of claim 1, further comprising:
  causing, based on the user request, output of one or more thumbnail images corresponding to a plurality of video segments associated with the desired topic.

13. The method of claim 1, further comprising:
  sending, to the user device and based on the trending topic, one or more thumbnail images corresponding to a plurality of video segments; and
  updating, based on an additional trending topic, the one or more thumbnail images.

14. The method of claim 1, further comprising:
  determining the spread of each of the first plurality of words and the second plurality of words across different content channels b determining, for one or more of the first plurality of words and the second plurality of words, a volume of mentions of the one or more of the first plurality of words and the second plurality of words across each of a plurality of different television channels.

15. The method of claim 1, further comprising:
  determining a plurality of trends based on a rate of change, in the video content, of mentions associated with a plurality of topics; and
  sending, to the user device and based on the plurality of trends, a plurality of thumbnail images, wherein each of the plurality of thumbnail images indicates a different trend.

16. The method of claim 1, wherein the video content comprises a plurality of television shows.

17. The method of claim 1, further comprising generating the search results based on the search keywords, wherein the search results comprise a trending topic label on one of a plurality of video segments.

18. A system comprising:
  a user device; and
  a computing device comprising:
    one or more processors; and
    memory storing instructions that, when executed by the one or more processors, cause the computing device to:
      receive a user request to query for a desired topic;
      determine a trending topic, associated with video content, that is related to the desired topic by:
        determining a first plurality of words associated with the video content by receiving data corresponding to one or more words spoken in the video content:
        querying a database that stores a second plurality of words associated with topics trending on one or more websites, and
        determining the trending topic based on a frequency corresponding to the first plurality of words and the second plurality of words and based on a spread, across different content channels, of the first plurality of words and the second plurality of words;
      generate, based on the user request, search keywords comprising:
        a first keyword corresponding to the desired topic, and
        a second keyword corresponding to the determined trending topic; and
      send, to the user device, search results based on the search keywords.

19. The system of claim 18, wherein the instructions, when executed by the one or more processors, cause the computing device to receive the data corresponding to the one or more words spoken in the video content by causing the computing device to:
 receive a plurality of streams, wherein each stream of the plurality of streams comprises additional video content different from the video content; and
 for each stream of the plurality of streams:
  receive, based on a transcript of the additional video content of the stream, an additional plurality of words in the additional video content of the stream.

20. The system of claim 18, wherein the instructions, when executed by the one or more processors, cause the computing device to determine the trending topic by causing the computing device to:
 determine, based on how often each of the first plurality of words and the second plurality of words is mentioned across a plurality of streams, a popularity score for each of the first plurality of words and the second plurality of words.

21. The system of claim 18, wherein the instructions, when executed by the one or more processors, cause the computing device to receive the data corresponding to the one or more words spoken in the video content by causing the computing device to:
 receive transcripts of additional video content.

22. An apparatus comprising:
 one or more processors; and
 memory storing instructions that, when executed by the one or more processors, cause the apparatus to:
  receive a user request to query for a desired topic;
  determine a trending topic, associated with video content, that is related to the desired topic by:
   determining a first plurality of words associated with the video content by receiving data corresponding to one or more words spoken in the video content;
   querying a database that stores a second plurality of words associated with topics trending on one or more websites; and
   determining the trending topic based on a frequency corresponding to the first plurality of words and the second plurality of words and based on a spread, across different content channels, of the first plurality of words and the second plurality of words;
  generate, based on the user request, search keywords comprising:
   a first keyword corresponding to the desired topic, and
   a second keyword corresponding to the determined trending topic; and
  send, to a user device, search results based on the search keywords.

23. The apparatus of claim 22, wherein the instructions, when executed by the one or more processors, cause the apparatus to receive the data corresponding to the one or more words spoken in the video content by causing the apparatus to:
 receive a plurality of streams, each stream of the plurality of streams comprising additional video content different from the video content; and
 for each stream of the plurality of streams:
  receive, based on a transcript of the additional video content of the stream, an additional plurality of words in the additional video content of the stream.

24. The apparatus of claim 22, wherein the instructions, when executed by the one or more processors, cause the apparatus to determine the trending topic by causing the apparatus to:
 determine, based on how often each of the first plurality of words and the second plurality of words is mentioned across a plurality of streams, a popularity score for each of the first plurality of words and the second plurality of words.

25. The apparatus of claim 22, wherein the instructions, when executed by the one or more processors, cause the apparatus to receive the data corresponding to the one or more words spoken in the video content by causing the apparatus to:
 receive transcripts of additional video content.

26. A non-transitory computer readable medium storing instructions that, when executed, cause:
 receiving a user request to query for a desired topic;
 determining a trending topic, associated with video content, that is different related to the desired topic by:
  determining a first plurality of words associated with the video content by receiving data corresponding to one or more words spoken in the video content;
  querying a database that stores a second plurality of words associated with topics trending on one or more websites;
  determining the trending topic based on a frequency corresponding to the first plurality of words and the second plurality of words and based on a spread, across different content channels, of the first plurality of words and the second plurality of words;
 generating, based on the user request, search keywords comprising:
  a first keyword corresponding to the desired topic, and
  a second keyword corresponding to the determined trending topic; and
 sending, to a user device, search results based on the search keywords.

27. The non-transitory computer readable medium of claim 26, wherein the instructions, when executed, further cause the receiving the data corresponding to the one or more words spoken in the video content by causing:
 receiving a plurality of streams, wherein each stream of the plurality of streams comprises additional video content different from the video content; and
 for each stream of the plurality of streams:
  receiving, based on a transcript of the additional video content of the stream, an additional plurality of words in the additional video content of the stream.

28. The non-transitory computer readable medium of claim 26, wherein the instructions, when executed, further cause the determining the trending topic by causing:
 determining, based on how often each of the first plurality of words and the second plurality of words is mentioned across a plurality of streams, a popularity score for each of the first plurality of words and the second plurality of words.

* * * * *

UNITED STATES PATENT AND TRADEMARK OFFICE
CERTIFICATE OF CORRECTION

PATENT NO. : 11,997,340 B2
APPLICATION NO. : 15/695580
DATED : May 28, 2024
INVENTOR(S) : Burkitt et al.

Page 1 of 1

It is certified that error appears in the above-identified patent and that said Letters Patent is hereby corrected as shown below:

In the Specification

Column 4, Line 66:
Delete "i/f" and insert --"if"--

Column 5, Line 52:
Delete "web site," and insert --website,--

Column 14, Line 1:
Delete "103" and insert --703--

Column 14, Line 14:
Delete "web site" and insert --website--

Column 22, Line 39:
Delete "110" and insert --101--

Column 22, Line 40:
Delete "110" and insert --101--

In the Claims

Column 25, Line 49:
In Claim 6, delete "sane" and insert --same--

Signed and Sealed this
Twenty-seventh Day of May, 2025

Coke Morgan Stewart
*Acting Director of the United States Patent and Trademark Office*